(12) United States Patent
Kim et al.

(10) Patent No.: US 9,154,809 B2
(45) Date of Patent: Oct. 6, 2015

(54) ENCODING/DECODING METHOD AND DEVICE FOR HIGH-RESOLUTION MOVING IMAGES

(75) Inventors: Sunyeon Kim, Seoul (KR); Jeongyeon Lim, Gyeonggi-do (KR); Yunglyul Lee, Seoul (KR); Joohee Moon, Seoul (KR); Byeungwoo Jeon, Gyeonggi-do (KR); Haekwang Kim, Seoul (KR); Jeonghoon Seo, Seoul (KR); Kioh Kim, Gyeonggi-do (KR); Sungwook Hong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 810 days.

(21) Appl. No.: 13/395,811

(22) PCT Filed: Sep. 3, 2010

(86) PCT No.: PCT/KR2010/006017
§ 371 (c)(1),
(2), (4) Date: Apr. 28, 2012

(87) PCT Pub. No.: WO2011/031044
PCT Pub. Date: Mar. 17, 2011

(65) Prior Publication Data
US 2012/0201300 A1    Aug. 9, 2012

(30) Foreign Application Priority Data
Sep. 14, 2009    (KR) .......................... 10-2009-0086305

(51) Int. Cl.
*H04N 7/26* (2006.01)
*H04N 19/86* (2014.01)
(Continued)

(52) U.S. Cl.
CPC ............ *H04N 19/86* (2014.11); *H04N 19/117* (2014.11); *H04N 19/122* (2014.11);
(Continued)

(58) Field of Classification Search
USPC ...................................................... 375/240.12
See application file for complete search history.

(56) References Cited

U.S. PATENT DOCUMENTS

| 2003/0053711 | A1 * | 3/2003 | Kim ............................ 382/268 |
| 2005/0249291 | A1 * | 11/2005 | Gordon et al. ........... 375/240.18 |
| 2007/0098078 | A1 * | 5/2007 | Kim et al. ................ 375/240.24 |

FOREIGN PATENT DOCUMENTS

| KR | 10-1998-0013412 | 4/1998 |
| KR | 10-2000-0032761 | 6/2000 |
| KR | 10-2007-0047523 | 5/2007 |

OTHER PUBLICATIONS

International Search Report mailed Apr. 21, 2011 for PCT/KR2010/006017, citing the above references.

(Continued)

*Primary Examiner* — Tat Chio
*Assistant Examiner* — Nguyen Truong
(74) *Attorney, Agent, or Firm* — Lowe Hauptman & Ham, LLP

(57) ABSTRACT

Disclosed is a high-resolution video encoding/decoding method and apparatus. The video encoding method includes: predicting a current block to generate a predicted block, subtracting the predicted block from the current block to generate a residual block, determining a transform and quantization type according to the block type of the current block; transforming and quantizing the residual block according to the determined transform and quantization type; and encoding the transformed and quantized residual block. According to the video encoding/decoding method and apparatus, not only the encoding efficiency can be improved because it enables an encoding using a high correlation between temporally/spatially adjacent pixels appearing in a video, but the compression efficiency can also be improved by reducing block distortion.

9 Claims, 19 Drawing Sheets

(51) Int. Cl.
*H04N 19/159* (2014.01)
*H04N 19/176* (2014.01)
*H04N 19/122* (2014.01)
*H04N 19/129* (2014.01)
*H04N 19/61* (2014.01)
*H04N 19/117* (2014.01)
*H04N 19/80* (2014.01)

(52) U.S. Cl.
CPC .......... *H04N 19/129* (2014.11); *H04N 19/159* (2014.11); *H04N 19/176* (2014.11); *H04N 19/61* (2014.11); *H04N 19/80* (2014.11)

(56) References Cited

OTHER PUBLICATIONS

S. Naito et al., Visual Communication and Image Processing, "Efficient coding scheme for super high definition video based on extending H.264 high profile", Jan. 19, 2006pp. 1-8, vol. 6077 607727.

P. Chen et al., "Video Coding Using Extended Block Sizes", Oct. 8-10, 2008, pp. 1-3.

"New Generation Video Compression Coding Standard-H. 264AVC", 34 pages.

* cited by examiner

MF FOR 8X4 TRANSFORM ACCORDING TO ONE
ASPECT OF PRESENT DISCLOSURE

|        | ax    | (2/3)bx | cx    | (1/2)ay | (1/3)by | (1/2)cy |
|--------|-------|---------|-------|---------|---------|---------|
| 0.625  | 18536 | 17446   | 23447 | 11723   | 11034   | 14829   |
| 0.6875 | 16851 | 15860   | 21315 | 10658   | 10031   | 13481   |
| 0.8125 | 14259 | 13420   | 18036 | 9018    | 8488    | 11407   |
| 0.875  | 13240 | 12461   | 16748 | 8374    | 7881    | 10592   |
| 1      | 11585 | 10904   | 14654 | 7327    | 6896    | 9268    |
| 1.125  | 10298 | 9692    | 13026 | 6513    | 6130    | 8238    |

*FIG. 8*

| Mode 0 | | | |
|---|---|---|---|
| 1 | 5 | 6 | 7 |
| 2 | 4 | 8 | 13 |
| 3 | 9 | 12 | 14 |
| 10 | 11 | 15 | 16 |

| Mode 1 | | | |
|---|---|---|---|
| 2 | 1 | 8 | 9 |
| 3 | 7 | 10 | 13 |
| 4 | 6 | 11 | 14 |
| 5 | 12 | 16 | 15 |

| Mode 2 | | | |
|---|---|---|---|
| 1 | 4 | 5 | 10 |
| 3 | 2 | 7 | 13 |
| 6 | 8 | 12 | 15 |
| 9 | 11 | 14 | 16 |

| Mode 3 | | | |
|---|---|---|---|
| 1 | 2 | 3 | 10 |
| 4 | 5 | 6 | 11 |
| 7 | 8 | 9 | 15 |
| 12 | 13 | 14 | 16 |

| Mode 4 | | | |
|---|---|---|---|
| 1 | 3 | 10 | 11 |
| 2 | 4 | 9 | 13 |
| 5 | 8 | 12 | 14 |
| 6 | 7 | 15 | 16 |

| Mode 5 | | | |
|---|---|---|---|
| 2 | 4 | 7 | 10 |
| 1 | 5 | 8 | 11 |
| 3 | 6 | 9 | 16 |
| 12 | 13 | 14 | 15 |

| Mode 6 | | | |
|---|---|---|---|
| 2 | 1 | 7 | 9 |
| 3 | 6 | 8 | 12 |
| 4 | 10 | 11 | 15 |
| 5 | 13 | 14 | 16 |

| Mode 7 | | | |
|---|---|---|---|
| 1 | 2 | 3 | 4 |
| 5 | 10 | 9 | 13 |
| 6 | 8 | 11 | 16 |
| 7 | 12 | 15 | 14 |

| Mode 8 | | | |
|---|---|---|---|
| 3 | 5 | 1 | 7 |
| 2 | 4 | 6 | 8 |
| 9 | 11 | 13 | 15 |
| 10 | 14 | 12 | 16 |

*FIG. 23*

ENCODING/DECODING METHOD AND DEVICE FOR HIGH-RESOLUTION MOVING IMAGES

CROSS REFERENCE TO RELATED APPLICATION

This application claims the priority of Korean Patent Application No. 10-2009-0086305, filed on Sep. 14, 2009 in the KIPO (Korean Intellectual Property Office). Further, this application is the National Phase application of International Application No. PCT/KR2010/006017 filed Sep. 3, 2010, which designates the United States and was published in Korean.

TECHNICAL FIELD

The present disclosure relates to a high-resolution video encoding/decoding method and apparatus. More particularly, the present disclosure relates to a method and apparatus for improving the encoding efficiency by performing encoding and decoding in units of various types of blocks and performing transform, quantization, scanning, and filtering according to a block type appropriate to corresponding encoding and decoding.

BACKGROUND ART

The statements in this section merely provide background information related to the present disclosure and may not constitute prior art.

Moving Picture Experts Group (MPEG) and Video Coding Experts Group (VCEG) have developed an improved and excellent video compression technology over the existing MPEG-4 Part 2 and H.263 standards. The new standard is called H.264/AVC (Advanced Video Coding) and was released simultaneously as MPEG-4 Part 10 AVC and ITU-T Recommendation H.264. The H.264/AVC (hereinafter referred to as 'H.264') can reduce the number of bits of encoded data by performing intra prediction/inter prediction in units of macroblocks each having various types of subblocks to generate a residual signal, transforming and quantizing the generated residual signal, and then encoding the transformed and quantized residual signal.

A video encoding apparatus employing a typical encoding method in units of macroblocks divides an input video into macroblocks, performs prediction with a subblock size which the macroblock may have according to an inter mode or an intra mode, for each macroblock to generate a residual block, applying the 4×4 or 8×8 discrete cosine transform (DCT)-based integer transform to the generated residual block to generate a transform coefficient, and quantizes the transform coefficient according to a given quantization parameter (QP). The blocking effects caused by the transform and quantization processes are reduced through loop filtering.

Since typical video compression technologies, such as the H.264, perform encoding in units of 16×16 macroblocks into which a video to be encoded is divided, and also fix the unit of transform at a block size of 4×4 or 8×8, there is a problem that the encoding efficiency is decreased when a video has high correlations between pixels. That is, when there is high correlations between pixels of a video, it may be efficient to perform prediction in units of macroblocks larger than 16×16 sized macroblocks or in units of various types of macroblocks, and thus it may also be efficient to use various transform block sizes other than the 4×4 block size or 8×8 block size as the unit of transform, but typical video compression technologies cannot perform adaptive encoding according to the features of the video because the macroblock size and the transform block size are fixed, which causes a problem of decreasing the encoding efficiency.

DISCLOSURE

Technical Problem

Therefore, the present disclosure has been made in view of the above-mentioned problems, and the present disclosure proposes to improve the compression efficiency by performing encoding in units of various types of macroblocks appropriate to a high-resolution video and correspondingly performing various types of prediction, transform and quantization, scanning, filtering, and the like.

Technical Solution

An aspect of the present disclosure provides a video encoding method including: dividing an input video into a plurality of macroblocks having various shapes or sizes; encoding each of the macroblocks; and generating macroblock information indicating the shape or size of each of the macroblocks.

Encoding of each of the macroblocks may include dividing each of the macroblocks into a plurality of subblocks; performing prediction encoding for each of the subblocks; and generating prediction mode information indicating a prediction mode for each of the subblocks and macroblock division information indicating the size of each of the subblocks.

Encoding of each of the macroblocks may include predicting each of the subblocks to obtain a predicted subblock; obtaining a residual block representing difference between each of the subblocks and the predicted subblock of each of the subblocks; determining a transform type based on at least one of the size of each of the macroblocks, the prediction mode, and the size of each of the subblocks; transforming the residual block according to the determined transform type; and quantizing the transformed residual block.

Encoding of each of the macroblocks may further include encoding information indicating the determined transform type.

The information indicating the transform type may include the size or kind of transform.

Each of the macroblocks may have a rectangular shape in which lengths of horizontal and vertical sides are different.

Determining of the transform type may include, when the prediction mode is an intra prediction mode, determining the size of transform to be identical to the size of the predicted subblock.

Transforming of the residual block may include, when the size of the residual block is smaller than the determined size of transform, combining a plurality of residual blocks with each other to generate a combined residual block having a size equal to the size of transform, and then transforming the combined residual block.

Encoding of each of the macroblocks may include scanning coefficients of the transformed and quantized residual block by using a scanning pattern selected according to the prediction mode.

Scanning of the coefficients may include, when the prediction mode is an intra prediction mode, scanning the coefficients of the transformed and quantized residual block by using a scanning pattern corresponding to an intra prediction mode used for prediction of each of the subblocks from among a plurality of intra prediction modes.

Scanning of the coefficients may include, when the prediction mode is an inter prediction mode, scanning the coefficients of the transformed and quantized residual block by using a scanning pattern selected according to the transform type for the residual block.

Another aspect of the present disclosure provides a video encoding apparatus including: a macroblock type determiner for dividing an input video into a plurality of macroblocks having different shapes or sizes; and a macroblock encoder for encoding each of the macroblocks and encoding macroblock information indicating the shape or size of each of the macroblocks.

Yet another aspect of the present disclosure provides a video decoding method including: receiving video data obtained by dividing an input video into a plurality of macroblocks having different shapes or sizes and encoding each of the macroblocks; decoding macroblock information indicating the shape or size of each of the macroblocks; and decoding each of the macroblocks based on the macroblock information.

Decoding of each of the macroblocks may include, when each of the macroblocks is divided into a plurality of subblocks, decoding macroblock division information indicating the size of each of the subblocks and prediction mode information indicating a prediction mode for each of the subblocks; and obtaining a predicted subblock of each of the subblocks based on the macroblock division information and the prediction mode information.

Decoding of each of the macroblocks may include determining an inverse transform type based on at least one of the size of each of the macroblocks, the prediction mode, and the size of each of the subblocks; inverse-quantizing and inverse-transforming a residual block according to the determined inverse transform type to obtain an inverse-quantized and inverse-transformed residual block; and adding the inverse-quantized and inverse-transformed residual block to the predicted subblock to obtain a reconstructed block.

Determining of the inverse transform type may include determining the inverse transform type based on information indicating the inverse transform type.

The information indicating the inverse transform type may include the size or kind of inverse transform.

Each of the macroblocks may have a rectangular shape in which lengths of horizontal and vertical sides are different.

Determining of the inverse transform type may include, when the prediction mode is an intra prediction mode, determining the size of inverse transform to be identical to the size of each of the subblocks.

Decoding of each of the macroblocks may further include, when the size of the predicted subblock is smaller than the determined size of inverse transform, dividing the inverse-quantized and inverse-transformed residual block into a plurality of residual subblocks each having a size equal to the size of the predicted subblock; and adding each of the residual subblocks to the predicted subblock to obtain a reconstructed block.

Decoding of each of the macroblocks may further include scanning a coefficient string of a transformed and quantized residual block to obtain a two-dimensional transformed and quantized residual block, wherein scanning of the coefficient string is selected according to the prediction mode.

Scanning of the coefficient string may include, when the prediction mode is an intra prediction mode, scanning the coefficient string of the transformed and quantized residual block by using a scanning pattern corresponding to an intra prediction mode used for prediction of each of the subblocks from among a plurality of intra prediction modes.

Scanning of the coefficient string may include, when the prediction mode is an inter prediction mode, scanning the coefficient string of the transformed and quantized residual block by using a scanning pattern selected according to the inverse transform type.

Still yet another aspect of the present disclosure provides a video decoding apparatus including: a decoder for receiving video data obtained by dividing an input video into a plurality of macroblocks having different shapes or sizes and encoding each of the macroblocks, and decoding macroblock information indicating the shape or size of each of the macroblocks; and an inverse quantizer and inverse transformer for inverse-quantizing and inverse-transforming each of the macroblocks based on the macroblock information.

Advantageous Effects

According to the present disclosure as described above, not only the encoding efficiency can be improved because it enables an encoding using a high correlation between temporally/spatially adjacent pixels appearing in a video, but the compression efficiency can also be improved by reducing block distortion. Further, the number of times of performing filtering can be decreased, which makes it possible to decrease the implementation complexity of video encoding and decoding apparatuses.

DESCRIPTION OF DRAWINGS

FIG. 8 is a view illustrating MF for 8×4 transform in accordance with an aspect of the present disclosure;

FIG. 23 is a view illustrating a scanning pattern for coefficients of an intra 4×4 block according to intra prediction modes in accordance with an aspect of the present disclosure.

MODE FOR INVENTION

Figure 1:
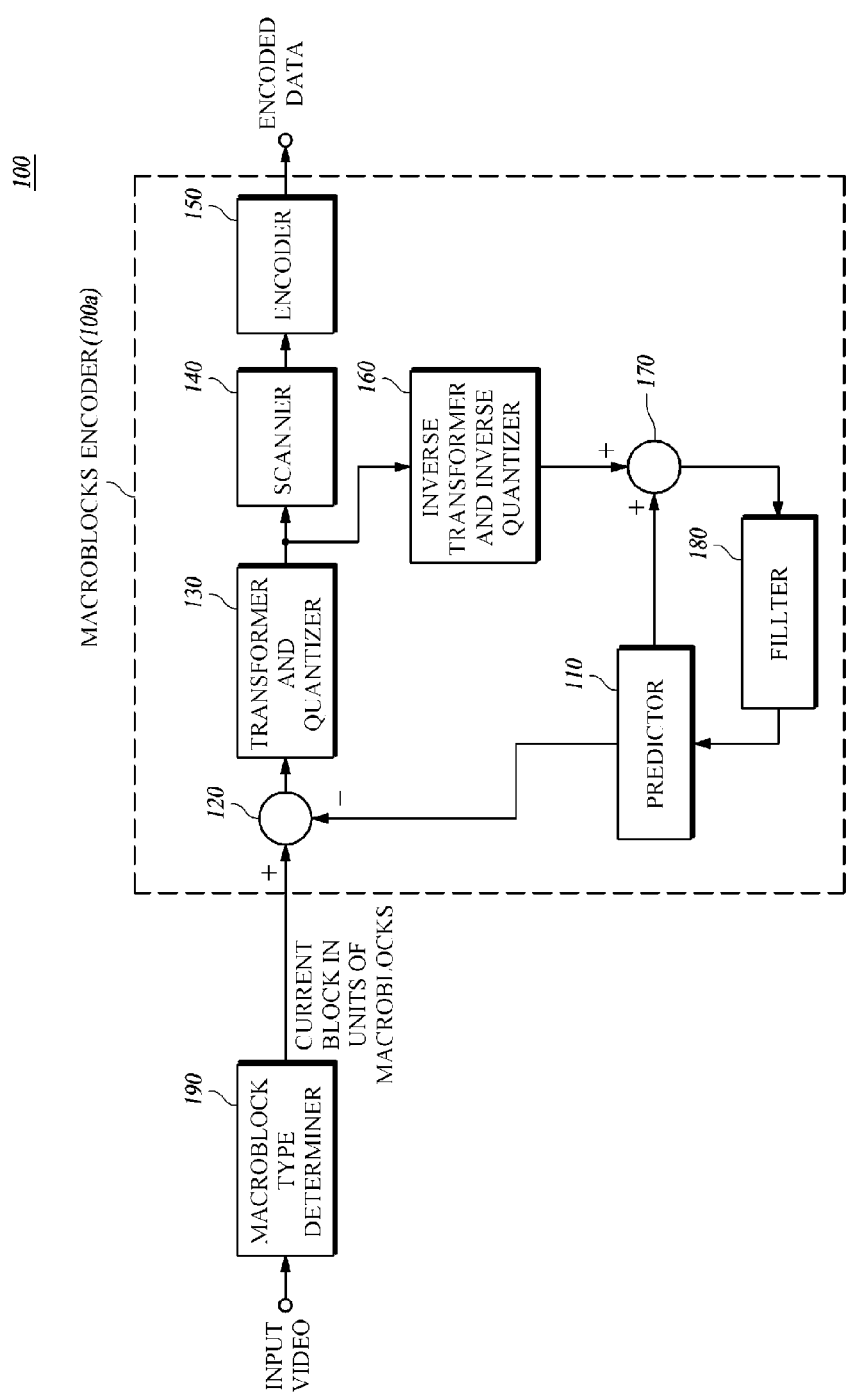
FIG. 1 is a schematic block diagram illustrating a structure of a video encoding apparatus in accordance with an aspect of the present disclosure.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 schematically illustrates a structure of a video encoding apparatus in accordance with an aspect of the present disclosure.

The video encoding apparatus 100 according to an aspect of the present disclosure is an apparatus for encoding a video, and may include a predictor 110, a subtractor 120, a transformer and quantizer 130, a scanner 140, an encoder 150, an inverse quantizer and inverse transformer 160, an adder 170, a filter 180, and a macroblock type determiner 190. This video encoding apparatus 100 may be a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication device such as a modem for carrying out communications between various devices or wired/wireless communication networks, a memory for storing various programs for encoding videos and related data, and a microprocessor for executing the programs to effect to operations and controls.

An input video to be encoded, such as a frame or slice, may be divided into unit blocks for encoding. In the present disclosure, each of the unit blocks for encoding or decoding is referred to as a macroblock. According to an aspect of the present disclosure, the macroblock may have a variable size of M×N. Here, each of M and N may be an integer having a value of $2^n$ (where, n is an integer equal to or greater than 1), and in particular, an integer larger than or equal to 16. The macroblock according to the present disclosure differs from conventional macroblocks in that it may have a variable shape or size.

In addition, according to the present disclosure, a macroblock of a different shape or size may be used for each input video to be encoded, such as a frame or slice. Further, one input video to be encoded or decoded, such as a frame or slice, may be divided into a plurality of macroblocks having different shapes or sizes, which are in turn encoded or decoded. Macroblock information indicating the shape or size of each macroblock is encoded, and the encoded macroblock information is included in a picture header, slice header, or macroblock header. When a video decoding apparatus decodes encoded data, it may determine the type of a macroblock to be decoded by using the macroblock information. What type of block is used may be determined by selecting a block type that yields the optimal efficiency when video encoding is performed using various types of blocks, or selecting a block type according to features obtained by analyzing the properties of a frame. For example, if a frame video has high spatial redundancy, then a square macroblock larger than the conventional fixed 16×16 macroblock, such as a 32×32 macroblock or 64×64 macroblock, may be selected as the unit of encoding. Alternatively, if a frame video has a high horizontal or vertical correlation, then a macroblock having a horizontally or vertically long shape may be selected. To this end, the video encoding apparatus 100 may include a macroblock type determiner 190 for determining a macroblock type, dividing an input video to be encoded, such as a frame or slice, into macroblocks each having the determined shape or size, encoding macroblock information for the macroblock type, and including the encoded macroblock information in encoded data.

As shown in FIG. 1, a macroblock encoder 100a, which is a component of the present disclosure, may include the predictor 110, the subtractor 120, the transformer and quantizer 130, the scanner 140, the encoder 150, the inverse quantizer and inverse transformer 160, the adder 170, and the filter 180. The macroblock encoder 100a encodes each macroblock, and encodes macroblock information indicating the shape or size of each macroblock.

The predictor 110 predicts a current block to be encoded by using other previously decoded pixel values to generate a predicted block of the current block. That is, the predictor 110 predicts a current block by using intra prediction, inter prediction, or the like to generate a predicted block having a predicted pixel value as the pixel value of each pixel.

The current block to be predicted may be a macroblock, and may also be a subblock obtained by dividing the macroblock so as to optimize a predicted pixel value, if necessary. That is, a macroblock as the unit of encoding may be further divided into a plurality of prediction units each having a size smaller than the macroblock. As a result, a predicted block may be generated in units of subblocks divided from the macroblock. Here, the macroblock may be an M×N block having a square or rectangular shape, and the subblock may be a P×Q block having horizontal and vertical sizes of $2^n$ within a range not exceeding the size of the macroblock respectively.

The predictor 110 generates information indicating the type of a subblock, i.e., a subblock type, and provides the generated information to the encoder 150. The encoder 150 encodes the information indicating the subblock type, and provides the encoded information to a video decoding apparatus. The subblock type includes a subblock prediction mode and a subblock size. A subblock may be classified into an intra subblock and an inter subblock according to the subblock prediction mode. The intra subblock may be further classified into an intra 4×4 block, an intra 8×8 block, an intra 16×16 block, and the like according to the subblock size. In addition, the intra subblock may be classified into various intra subblocks, such as an intra 32×32 block and an intra 16×32 block. The inter subblock may be classified into an inter 4×4 block, an inter 8×4 block, an inter 4×8 block, an inter 8×8 block, an inter 8×16 block, an inter 16×8 block, an inter 16×16 block, and the like. In addition, the inter subblock may be classified into various inter subblocks, such as an inter 32×16 block, an inter 16×32 block, and an inter 32×32 block.

According to an aspect of the present disclosure, the video encoding apparatus may generate prediction mode information indicating a prediction mode for each subblock and include the generated prediction mode information in a bitstream. The prediction mode may include an intra prediction mode, an inter prediction mode, a skip mode, and a direct mode.

Further, when a macroblock as the unit of encoding is divided into a plurality of subblocks for the sake of prediction, the video encoding apparatus according to the present disclosure may generate macroblock division information indicating the shape or size of subblocks into which the macroblock is divided and transmit the generated macroblock division information to a video decoding apparatus. The macroblock division information may be implemented in various ways according to how to divide a macroblock. According to an aspect of the present disclosure, the macroblock division information may include the starting position and size of each subblock within a macroblock. In this case, flexible block division is possible, but the amount of data to be transmitted is increased. According to another aspect of the present disclosure, the macroblock division information may be implemented by a flag of one or more bits, which indicates the type of division. Respective values possessed by the flag define different block division schemes. For example, if the value of the flag is "0", then the flag indicates that a block is not divided. Also, if the value of the flag is "1", then the flag indicates that a block is divided into four equi-sized subblocks. When there are three or more types of division, each type of division may be indicated by a flag of two or more bits.

As described above, prediction mode information and macroblock division information may be implemented by separate syntax elements, and may also be simultaneously expressed by one syntax element. Since the conventional H.264 standard fixes the size of a macroblock as the unit of encoding and decoding at 16×16, the prediction mode for a corresponding macroblock and the division mode for prediction of the macroblock can be indicated by only one syntax element "mb_type" generated for each macroblock. However, in the present disclosure, since the size or shape of a macroblock is variable, the video encoding apparatus may generate prediction mode information and macroblock division information together with macroblock information indicating the size or shape of a macroblock and provide them to a video decoding apparatus.

The subtractor 120 generates a residual block by subtracting the predicted block from the current block. That is, the subtractor 120 calculates a difference between the original pixel value of each pixel of the current block and the predicted pixel value of each pixel of the predicted block to generate a residual block having a residual signal.

The transformer and quantizer 130 determines the transform and quantization type according to the shape or size of the current macroblock to be encoded, the block type of the current macroblock or subblock, or the like, and transforms and quantizes the residual block according to the determined transform and quantization type. More specially, the transformer and quantizer 130 transforms the residual signal of the residual block into the frequency domain to generate a transformed residual block having a transform coefficient, and quantizes the transformed residual block to generate a transformed and quantized residual block having a quantized transform coefficient.

When the transformer and quantizer 130 transforms and quantizes the residual block, transform is not completed until quantization is completed because the transform process is included in the quantization process. Here, techniques for transforming a video signal in the space domain into the frequency domain, such as the Hadamard transform and the discrete cosine transform (DCT)-based integer transform (hereinafter referred to briefly as "integer transform"), may be used as the transforming method, and various quantization techniques, such as the dead zone uniform threshold quantization (hereinafter referred to as "DZUTQ") and the quantization weighted matrix, may be used as the quantizing method.

Further, various transform and quantization types like transform and quantization with a block size of P×Q are possible within a range not exceeding the size of the current macroblock. Here, the transform and quantization with a block size of P×Q may correspond to transform and quantization with a subblock size that the current M×N sized macroblock may have, in addition to typical transform and quantization with a block size 4×4 and transform and quantization with a block size of 8×8.

Further, the transformer and quantizer 130 may transform and quantize the residual block based on the transform and quantization type that is determined according to the prediction mode for the current macroblock or subblock and/or the size of the subblock (i.e., subblock as the unit of prediction). With regard to this, when the current subblock is of an intra block type, the transform and quantization type may be determined to be identical to the block size of the intra block type. Also, when the current subblock is of an inter block type, one transform and quantization type may be determined from among a plurality of transform and quantization types by using encoding cost. Here, the plurality of transform and quantization types may be not only transform and quantization types having the same size as the block size of the subblock, but also transform and quantization types having various block sizes. A procedure of transforming and quantizing the residual block by the transformer and quantizer 130 will be described in detail below.

The scanner 140 scans quantized transform coefficients of the transformed and quantized residual block output from the transformer and quantizer 130 to generate a quantized transform coefficient string. With regard to this, the scanning method is determined in consideration of the transform technique, the quantization technique, and the characteristics of the block (macroblock or subblock), and the scanning sequence is determined such that the scanned quantized transform coefficient string has the least length. Further, the scanning method may vary according to an intra block and an inter block. Details of the intra block and the inter block will be described below. While the scanner 140 is shown and described as being independently implemented in FIG. 1, the scanner 140 may be omitted and its function may be incorporated in the encoder 150.

The encoder 150 encodes the transformed and quantized residual block to generate encoded data. That is, the encoder 150 encodes the quantized transform coefficient string resulting from scanning the quantized transform coefficients of the transformed and quantized residual block output from the transformer and quantizer 130 to generate encoded data, or encodes the quantized transform coefficient string resulting from scanning in the scanner 140 to generate encoded data.

Entropy encoding may be used as this encoding technique, but various other unlimited encoding techniques are also available. Further, the encoded data output from the encoder 150 may include not only a bitstream resulting from encoding the quantized transform coefficient string, but also various information required to decode the encoded bitstream. Here, the various information required to decode the encoded bitstream may be above-mentioned information, that is, macroblock information indicating the size or shape of the macroblock as the unit of encoding, prediction mode information, macroblock division information indicating the division scheme or the size of the subblocks (i.e., blocks as the unit of prediction) in the case where the macroblock is divided into a plurality of subblocks for the sake of prediction, information on a motion vector in the case where the prediction mode is an inter prediction mode, information on the transform and quantization type, and the like, but may also be various other information.

The inverse quantizer and inverse transformer 160 inverse-quantizes and inverse-transforms the transformed and quantized residual block output from the transformer and quantizer 130 to reconstruct the residual block. Inverse quantization and inverse transform may be achieved by inversely performing the transform and quantization processes performed by the transformer and quantizer 130. That is, the inverse quantizer and inverse transformer 160 may perform inverse quantization and inverse transform by using transform and quantization information (e.g., information on the transform and quantization type) delivered from the transformer and quantizer 130 to inversely perform the procedure of transforming and quantizing the residual block by the transformer and quantizer 130.

The adder 170 adds the inverse-quantized and inverse-transformed residual block output from the inverse quantizer and inverse transformer 160 and the predicted block output from the predictor 110 to reconstruct the current block.

The filter 180 filters the current block reconstructed by the adder 170. With regard to this, the filter 180 reduces blocking effects occurring at the block boundaries of the video due to transform and quantization of the video in units of blocks and ringing noise occurring around the edges of the video due to high frequency loss. Here, a deblocking filter and a deringing filter may be used to reduce the blocking effects and the ringing noise respectively, and one of filtering using both the deblocking filter and the deringing filter, filtering using either the deblocking filter or the deringing filter, and filtering using none of the deblocking filter and the deringing filter may be selectively employed. Further, one of deblocking filtering applied at boundaries between subblocks and boundaries between macroblocks and deblocking filtering applied only at boundaries between macroblocks may be selectively employed.

In typical video encoding, a macroblock type used for video encoding is a square macroblock of 16×16 pixels, and a predicted block may be generated by performing at least one of intra prediction and inter prediction for each macroblock. The reason why video encoding in units of macroblocks is widely used is that it enables an efficient encoding in consideration of regional features of the video. Further, since various intra prediction or inter prediction methods are used to generate the predicted block, the encoding efficiency of the video is high.

Figure 2:
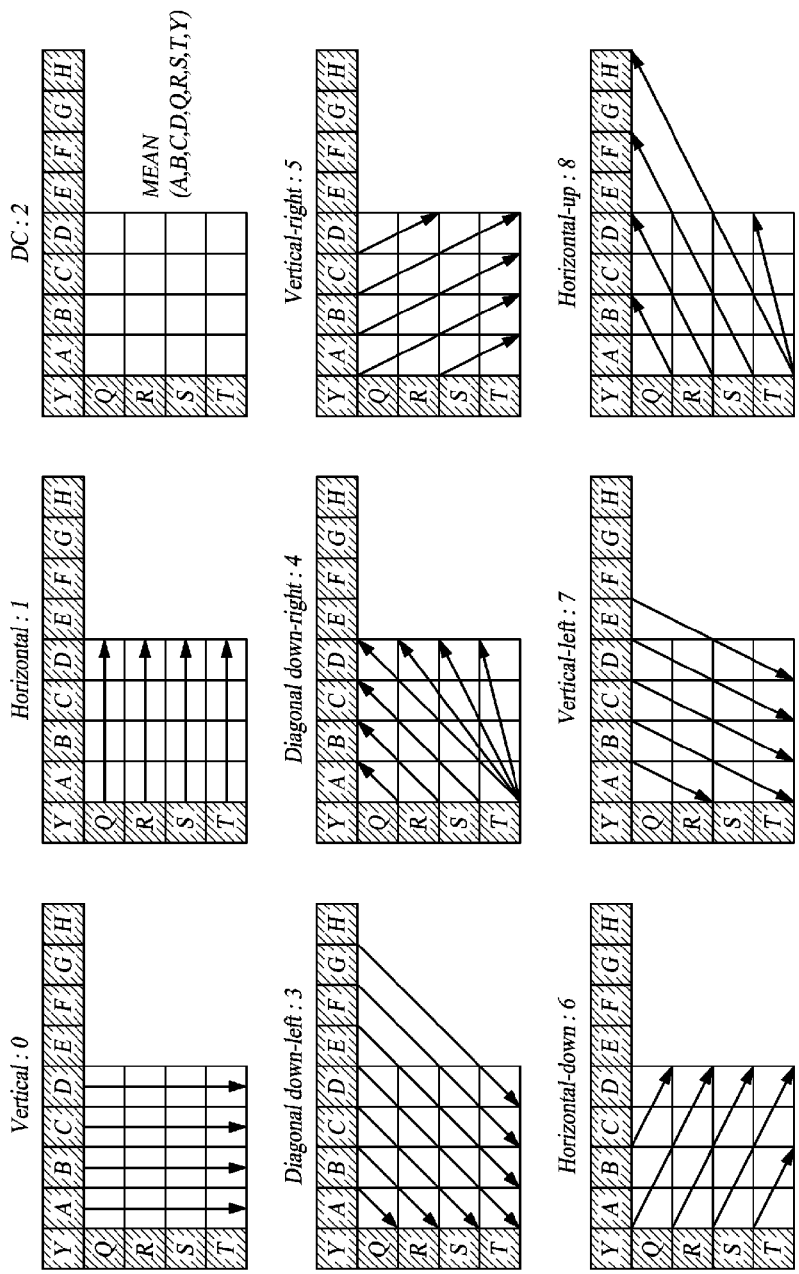
FIGS. 2 to 4 are views illustrating intra prediction modes according to macroblock types used in typical video encoding.
Figure 3:
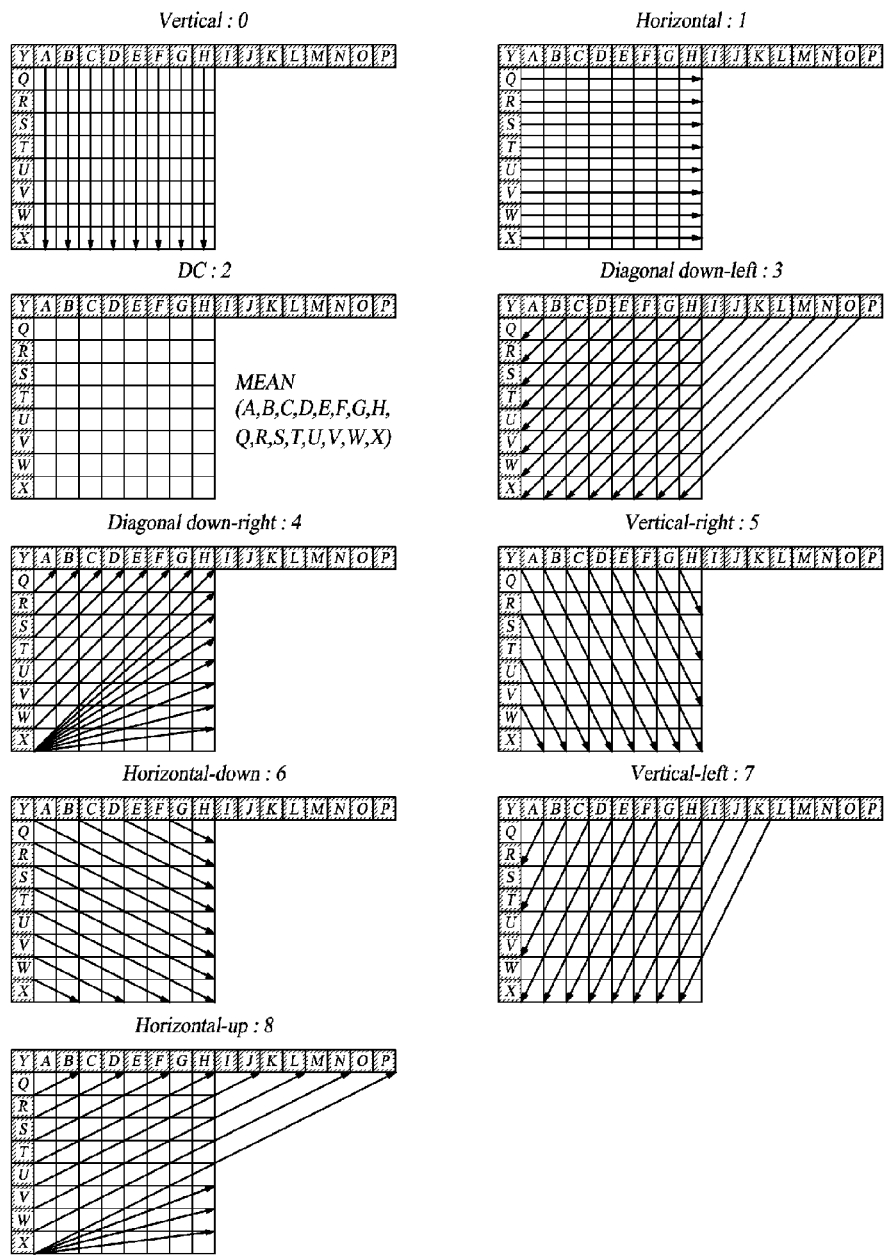
Figure 4:
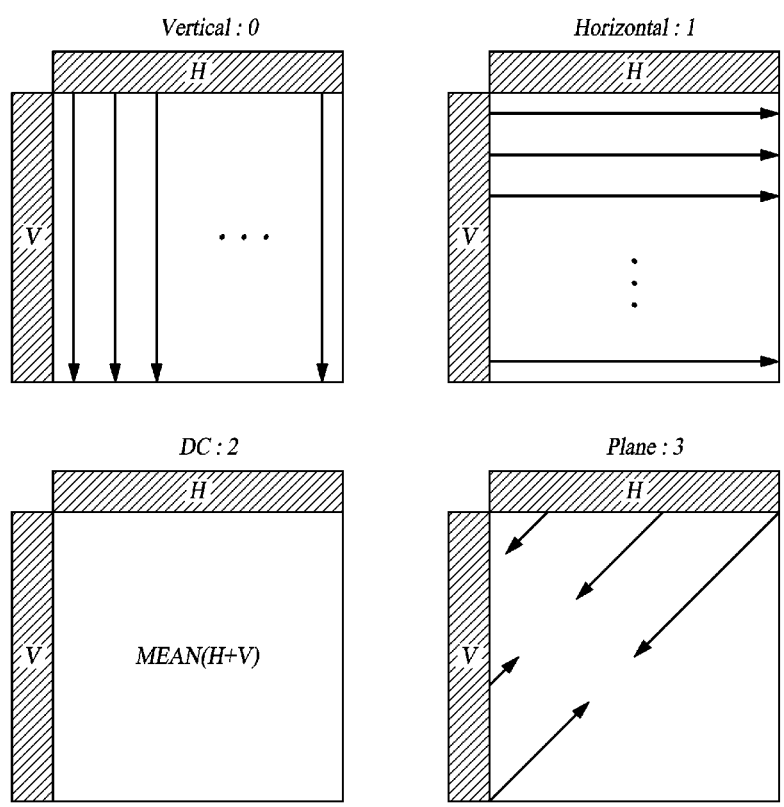

FIGS. 2 to 4 illustrate intra prediction modes according to macroblock types used in typical video encoding.

FIG. 2 illustrates nine intra prediction modes in the case where the macroblock type is an intra 4×4 macroblock, FIG. 3 illustrates nine intra prediction modes in the case where the macroblock type is an intra 8×8 macroblock, and FIG. 4 illustrates four intra prediction modes in the case where the macroblock type is an intra 16×16 macroblock.

When the macroblock type is an intra block type, a macroblock to be encoded is predicted using intra prediction. The intra block type is subdivided into an intra 4×4 macroblock, an intra 8×8 macroblock, an intra 16×16 macroblock, and the like. For each intra block type, the macroblock is predicted using adjacent pixels of previously encoded, decoded and reconstructed adjacent blocks according to the prediction modes as shown in FIGS. 2 to 4.

Figure 5:
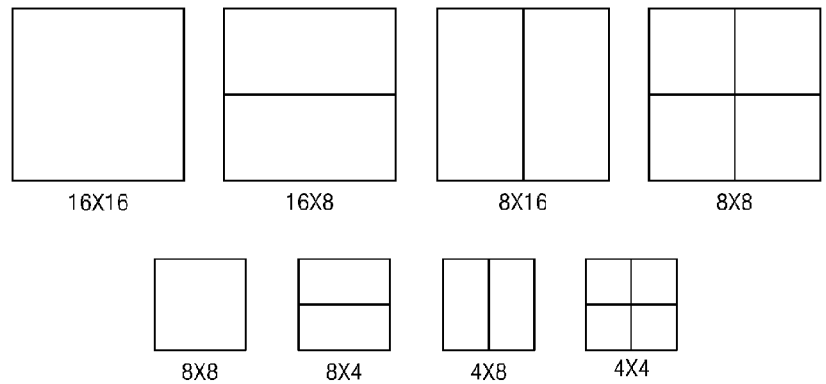
FIG. 5 is a view illustrating inter prediction modes according to a macroblock type used in typical video encoding.

FIG. 5 illustrates inter prediction modes according to a macroblock type used in typical video encoding.

When the macroblock type is an inter block type, a macroblock to be encoded is predicted using inter prediction. In this case, as shown in FIG. 5, a predicted block is generated by performing prediction with a block size of 16×16, 16×8, 8×16, or 8×8 for the macroblock by using a previously encoded, decoded and reconstructed frame. When prediction with a block size of 8×8 is performed for the macroblock, a predicted block is generated by performing prediction with a block size of 8×8, 8×4, 4×8, or 4×4 for each 8×8 block.

However, when a high-resolution video is encoded in units of macroblocks each having a block size of 16×16, as in typical video coding, it is impossible to efficiently perform encoding by using a high correlation between pixels, which is characteristic of the high-resolution video. This is because although the prediction accuracy of a predicted block generated in units of macroblocks each having an extended block size of M×N is similar to that of a predicted block generated in units of macroblocks each having a typical block size of 16×16, the number of macroblocks to be encoded in the case of encoding a video in units of 16×16 macroblocks is increased, and thus the encoding efficiency is decreased.

Further, the DCT-based integer transform with a block size of 4×4 or 8×8 is used in typical video encoding. The integer transform has advantages in terms of encoding efficiency and complexity because it does not perform operations on real numbers, which is a disadvantage involved in the DCT, but performs only operations on integers while maintaining characteristics of the DCT as much as possible. Blocking effects and ringing noise caused by transform in units of blocks may be minimized using filtering.

However, it is more efficient for the video encoding apparatus 100 to encode a high-resolution video by using various types of transform and quantization with a block size of P×Q, rather than by using only transform and quantization with the typical 4×4 or 8×8 block size. This is because in the case of encoding a wide area where pixels having a high correlation cluster together, which is characteristic of a high-resolution video, using only transform and quantization with the 4×4 or 8×8 block size results in significant blocking effects and loss of high frequency components.

Contrarily, if various types of transform and quantization with a block size of P×Q are available to perform transform and quantization, then blocking effects can be reduced, and ringing noise can also be reduced because loss of high frequency components is reduced as compared to when only the transform and quantization with the typical block size is used.

Thus, the number of times of filtering operations is also decreased, which makes it possible to decrease complexity for the filtering operations, which mainly contributes to the implementation complexity of the video encoding apparatus 100 and a video decoding apparatus to be described below. Further, since various types of transform and quantization with a block size of P×Q are used, the scanner 140 can scan quantized transform coefficients resulting from the transformer and quantizer 130 in a manner appropriate to the transform and quantization block size, as a result of which the encoding efficiency can be improved.

In an aspect of the present disclosure, therefore, in contrast to typical video encoding in which a video is encoded in units of macroblocks each having a block size of 16×16, a residual block is generated by performing prediction in units of macroblocks each having an extended block size of M×N. In addition, only the 4×4 or 8×8 block size is not used as the transform and quantization block size, but various types of transform and quantization with a block size of P×Q are used to perform transform and quantization, and filtering and scanning appropriate to the transform and quantization block size are performed.

Figure 6:
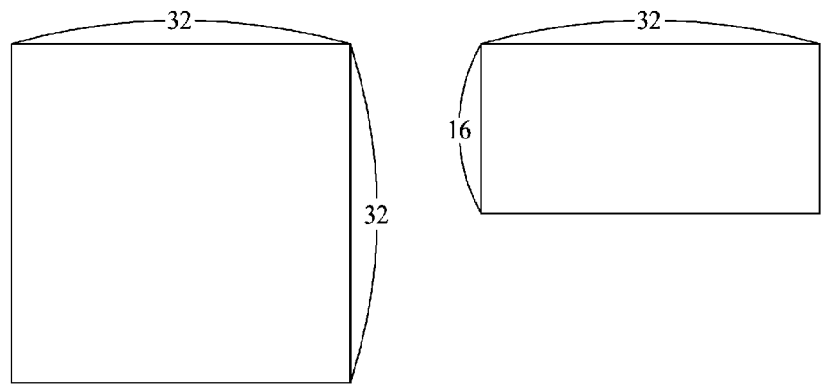
FIG. 6 is a view illustrating an M×N sized macroblock in accordance with an aspect of the present disclosure.

FIG. 6 illustrates an M×N sized macroblock in accordance with an aspect of the present disclosure.

According to an aspect of the present disclosure, a video may be encoded in units of various types of macroblocks including 64×64, 128×128, and 64×128 sized macroblocks, as well as 32×32 and 32×16 sized macroblocks as shown in FIG. 6. As shown in FIG. 6, the M×N sized macroblock may have not only a square shape, but also a rectangular shape.

Figure 7:
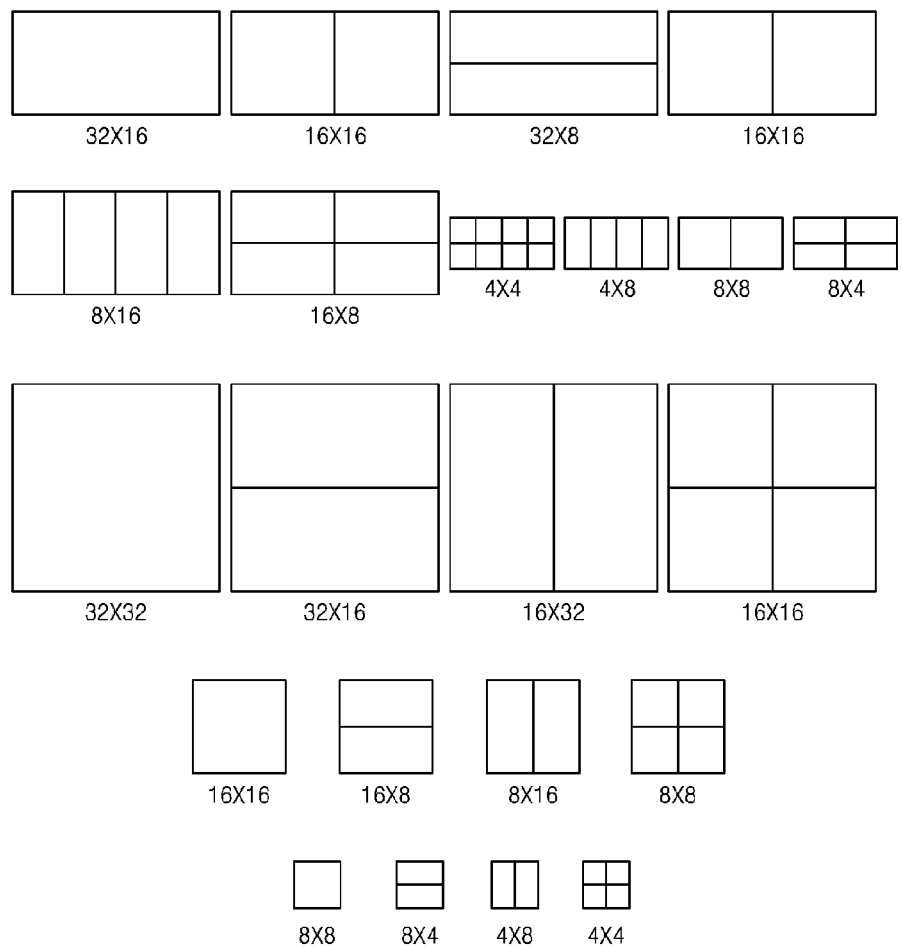
FIG. 7 is a view illustrating various types of sub macroblocks that an M×N sized macroblock may have in accordance with an aspect of the present disclosure.

FIG. 7 illustrates various types of sub macroblocks that an M×N sized macroblock may have in accordance with an aspect of the present disclosure.

FIG. 7 shows examples of the block sizes of sub macroblocks that a macroblock with a block size of 32×16 may have. When the macroblock is predicted using such sub macroblocks, a predicted block more analogous to the original macroblock can be generated, and thus the encoding efficiency can be further improved. With regard to this, M and N that determine the size of an M×N sized macroblock can be determined by $2^n$ respectively, and J and K that determine the size of a J×K sized sub macroblock have a value of $2^n$ within a range not exceeding M and N respectively.

The transformer and quantizer 130 transforms and quantizes a residual block according to the transform and quantization type to transform residual signals of the residual block into transform coefficients and generate quantized transform coefficients by quantizing the transform coefficients. With regard to this, the transformer and quantizer 130 may determine the transform and quantization block size for use in transform and quantization in consideration of the shape or size of a current macroblock to be encoded. That is, the size of a block as the unit of transform and quantization or the transform and quantization block size is equal to or greater than the size of a current macroblock. Further, when a current macroblock has a rectangular shape, rectangular transform may be selected. Further, block sizes available according to the size of a current macroblock may be selected as the transform and quantization block size. For example, when a current macroblock is a large block with a size of 64×64, transform with a larger size than 4×4 transform, 4×8 transform, 8×4 transform, or the like may be used. If a current macroblock is the conventional 16×16 sized macroblock, the typical 4×4 transform and 8×8 transform may be used. According to another aspect of the present disclosure, the transformer and quantizer 130 may determine the transform and quantization block size for use in transform and quantization in consideration of a prediction mode for a sub macroblock or the size of a block as the unit of prediction.

For example, when a block is of an intra block type, the size of a block that is subjected to intra prediction may be determined as the transform and quantization block size. That is, transform and quantization with a block size of 4×4 may be used in the case of intra 4×4 prediction, transform and quantization with a block size of 8×8 may be used in the case of intra 8×8 prediction, transform and quantization with a block size of 16×16 may be used in the case of intra 16×16 prediction, and transform and quantization with a block size of 16×8 may be used in the case of intra 16×8 prediction. Accordingly, when the unit of intra prediction is a block with a size of P×Q, transform and quantization with a block size of P×Q may be determined as the transform and quantization type.

As another example, when a block is of an inter block type, the transform and quantization block size at which encoding cost is minimized may be determined out of a plurality of transform and quantization block sizes. That is, one transform and quantization block size may be selected out of transform and quantization block sizes of 4×4, 8×8, 16×16, 32×16, 8×16, 16×8, and the like, and a residual block may be transformed and quantized using transform and quantization with the selected block size.

Hereinafter, transform and quantization processes according to an aspect of the present disclosure will be described on the assumption that transform and quantization with a block size of 8×4 is determined as the transform and quantization type.

Transform with a block size of 8×4 may be designed by a combination of the 4×4 integer transform and the 8×8 integer transform, and can be expressed by the following equation:

$$Y = A \times B^T \qquad \text{Equation 1}$$

In Equation 1, X denotes a residual block with a block size of 8×4, generated by a predicted block with a block size of 8×4, A denotes a matrix for the 4×4 integer transform, B denotes a matrix for the 8×8 integer transform, T denotes a transpose matrix that is a matrix obtained by interchanging the rows and columns of a corresponding matrix, and Y denotes a transformed residual block that is the result of performing the 8×4 transform for the residual block with a block size 8×4.

In the above equation, elements of A and $B^T$ can be represented as given in the following equation:

$$A = \begin{bmatrix} x & x & x & x \\ y & z & -z & -y \\ x & -x & -x & x \\ z & -y & y & -z \end{bmatrix}, \qquad \text{Equation 2}$$

$$B = \begin{bmatrix} a & b & c & d & a & e & f & g \\ a & d & f & -g & -a & -b & -c & -e \\ a & e & -f & -b & -a & g & c & d \\ a & g & -c & -e & a & d & -f & -b \\ a & -g & -c & e & a & -d & -f & b \\ a & -e & -f & b & -a & -g & c & -d \\ a & -d & f & g & -a & b & -c & -g \\ a & -b & c & -d & a & -e & f & -g \end{bmatrix}$$

In Equation 2, x of matrix A is ½, y of matrix A is $\sqrt{½}$ cos(π/8), z of matrix A is $\sqrt{½}$ cos(3π/8), a of matrix B is $\sqrt{⅛}$, b of matrix B is $\sqrt{²⁄₈}$ cos(π/16), c of matrix B is $\sqrt{²⁄₈}$ cos(2π/16), d of matrix B is $\sqrt{²⁄₈}$ cos(3π/16), e of matrix B is $\sqrt{²⁄₈}$ cos(5π/16), f of matrix B is $\sqrt{²⁄₈}$ cos(6π/16), and g of matrix B is $\sqrt{²⁄₈}$ cos(7π/16). Here, in order to perform integer operations while maintaining orthogonality that is characteristic of the DCT, each of the 4×4 integer transform and the 8×8 integer transform is decomposed and approximated as follows:

$$A = \begin{bmatrix} x & 0 & 0 & 0 \\ 0 & y & 0 & 0 \\ 0 & 0 & x & 0 \\ 0 & 0 & 0 & y \end{bmatrix} \begin{bmatrix} 1 & 1 & 1 & 1 \\ 1 & w & -w & -1 \\ 1 & -1 & -1 & 1 \\ w & 1 & -1 & -w \end{bmatrix} \quad \text{Equation 3}$$

$$B = \begin{bmatrix} 1 & 1 & 1 & K & 1 & L & N & M \\ 1 & K & N & -M & -1 & -1 & -1 & -L \\ 1 & L & -N & -1 & -1 & M & 1 & K \\ 1 & M & -1 & -L & 1 & K & -N & 1 \\ 1 & -M & -1 & L & 1 & -K & -N & 1 \\ 1 & -L & -N & 1 & -1 & -M & 1 & -K \\ 1 & -K & N & M & -1 & 1 & -1 & L \\ 1 & -1 & 1 & -K & 1 & -L & N & -M \end{bmatrix}$$

$$\begin{bmatrix} a & 0 & 0 & 0 & 0 & 0 & 0 & 0 \\ 0 & b & 0 & 0 & 0 & 0 & 0 & 0 \\ 0 & 0 & c & 0 & 0 & 0 & 0 & 0 \\ 0 & 0 & 0 & b & 0 & 0 & 0 & 0 \\ 0 & 0 & 0 & 0 & a & 0 & 0 & 0 \\ 0 & 0 & 0 & 0 & 0 & b & 0 & 0 \\ 0 & 0 & 0 & 0 & 0 & 0 & c & 0 \\ 0 & 0 & 0 & 0 & 0 & 0 & 0 & b \end{bmatrix}$$

In Equation 3, x of matrix A is ½ as in Equation 2, y of matrix A is approximated to $\sqrt{2/5}$, w (=z/y) of matrix A is approximated to ½, a of matrix B is $\sqrt{1/8}$ as in Equation 2, b of matrix B is approximated to $\sqrt{72/289}$, c of matrix B is approximated to $\sqrt{1/5}$, K (=d/b) of matrix B is approximated to ⅝, L (=e/b) of matrix B is approximated to ½, and M (=g/b) of matrix B is approximated to ¼. Through this process, Equation 1 can be rewritten as follows:

$$Y = (C \times D^T) \otimes E \quad \text{Equation 4}$$

In Equation 4, X and Y are the same as in Equation 1, C denotes the right 4×4 matrix in matrix A of Equation 3, and $D^T$ denotes the left 8×8 matrix in matrix B of Equation 3. The operator ⊗ denotes multiplication of coefficients of the resultant matrix of $(C \times D^T)$ by those of matrix E on an element-by-element basis. Matrix E denotes the 8×8 matrix derived in the process of decomposing to and approximating Equation 1 to Equation 4, and elements of matrix E are given by the following equation:

$$E = \begin{bmatrix} ax & bx & cx & bx & ax & bx & cx & bx \\ ay & by & cy & by & ay & by & cy & by \\ ax & bx & cx & bx & ax & bx & cx & bx \\ ay & by & cy & by & ay & by & cy & by \end{bmatrix} \quad \text{Equation 5}$$

In Equation 5, x, y, a, b, and c of matrix E are the same in Equation 3. It can be noted from Equation 5 that matrices C, $D^T$, and E have non-integer coefficients. Therefore, for integer operations, the respective matrices are scaled as given in the following equation:

$$C = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \quad \text{Equation 6}$$

$$D = \begin{bmatrix} 1 & 12/8 & 1 & 10/8 & 1 & 6/8 & 1/2 & 3/8 \\ 1 & 10/8 & 1/2 & -3/8 & -1 & -1 & -1 & -6/8 \\ 1 & 6/8 & -1/2 & 1- & -1 & 3/8 & 1 & 10/8 \\ 1 & 3/8 & -1 & -6/8 & 1 & 10/8 & -1/2 & -1 \\ 1 & -3/8 & -1 & 6/8 & 1 & -10/8 & -1/2 & 1 \\ 1 & -6/8 & -1/2 & 1 & -1 & -3/8 & 1 & -10/8 \\ 1 & -10/8 & 1/2 & 3/8 & -1 & 1 & -1 & 6/8 \\ 1 & -12/8 & 1 & -10/8 & 1 & -6/8 & 1/2 & -3/8 \end{bmatrix}$$

$$E = \begin{bmatrix} ax & 2/3bx & cx & 2/3bx & ax & 2/3bx & cx & 2/3bx \\ 1/2ay & 1/3by & 1/2cy & 1/3by & 1/2ay & 1/3by & 1/2cy & 1/3by \\ ax & 2/3bx & cx & 2/3bx & ax & 2/3bx & cx & 2/3bx \\ 1/2ay & 1/3by & 1/2cy & 1/3by & 1/2ay & 1/3by & 1/2cy & 1/3by \end{bmatrix}$$

Once the scaling process of Equation 6 is completed, the 8×4 integer transform is designed. That is, for the integer transform, the final integer transform with a block size of 8×4 is designed by including matrix E in the quantization process.

The basic quantization process can be represented by the following equation:

$$Z_{ij} = \text{round}(Y_{ij}/Q\text{step}) \quad \text{Equation 7}$$

In Equation 7, $Y_{ij}$ denotes elements expressed by a matrix after a residual block is transformed, and Qstep denotes the size of quantization step.

When the basic quantization operation performed as given in Equation 7 is applied to the actual quantization process for transform and quantization with a block size of 8×4, it can be represented as follows:

$$|Z_{ij}|=(|W_{ij}|\cdot MF+f)>>qbits \qquad \text{Equation 8}$$

$$\text{sign}(Z_{ij})=\text{sign}(W_{ij}) \qquad \text{Equation 9}$$

In Equation 8, $W_{ij}$ denotes elements expressed by a matrix after each residual signal of a residual block is transformed, MF denotes a multiplication factor determined according to a quantization parameter, and f, which is a factor determining a round-off error and the size of a dead zone, is $2^{qbits}/3$ when a current block is predicted by intra prediction and is fixed at $2^{qbits}/6$ when a current block is predicted by inter prediction. Here, qbits is 16+floor (QP/6) (where, floor means a round down operation), and may vary according to the maximum and minimum values of transform coefficients after transform.

With regard to this, matrix E of Equation 6 is included in MF, and MF is given as follows:

$$\frac{MF}{2^{qbits}}=\frac{PF}{Qstep} \qquad \text{Equation 10}$$

In Equation 10, PF means matrix E, and MF appropriate to each transform must be obtained and used because PF varies according to transform types and approximations.

FIG. 8 illustrates MF for 8×4 transform in accordance with an aspect of the present disclosure.

Since the MF value varies according to the positions of coefficients of matrix E of Equation 6, the first row of FIG. 8 represents the coefficient position according to matrix E of Equation 6, and the first column of FIG. 8 represents Qstep. Here, the MF value used is mathematically derived, but it may be modified because integer transform is not the optimal transform for video encoding.

By adaptively applying the above-mentioned transform and quantization with a block size of 8×4, transform and quantization may be performed according to various transform and quantization types including transform and quantization with a block size of P×Q, such as transform and quantization with a block size of 4×8 and transform and quantization with a block size of 16×8.

Further, according to an aspect of the present disclosure, the transformer and quantizer 130 may select a subblock with a size of $2^n \times 2^n$, which maximizes the transform and quantization efficiency of a current macroblock, in consideration of the size or shape of the current macroblock, the prediction mode and size of the current macroblock or a subblock for prediction, and the like. In the following, a description will be given of an aspect of the present disclosure in which a 64×64 sized macroblock is divided into subblocks having different sizes and then transform and quantization is performed.

Figure 22:
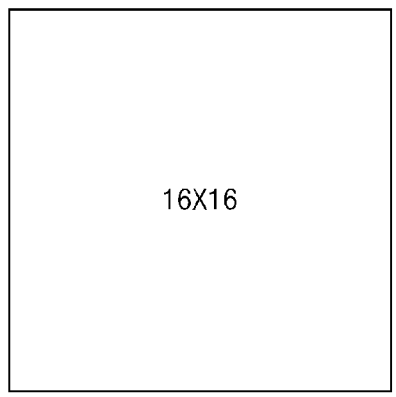
FIG. 22 is a view illustrating various subblocks into which a 64×64 macroblock is divided in accordance with an aspect of the present disclosure.
Figure 22:
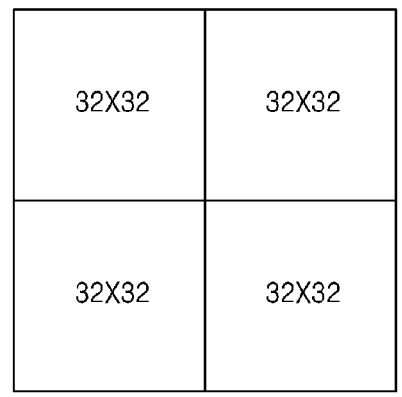

A 64×64 macroblock may be divided into four 32×32 subblocks, sixteen 16×16 subblocks, sixty four 8×8 subblocks, two hundred and fifty-six 4×4 subblocks, or one thousand and twenty-four 2×2 subblocks. FIG. 22 illustrates examples of dividing the 64×64 macroblock into 32×32 subblocks, 16×16 subblocks, and 8×8 subblocks respectively. The transformer and quantizer 130 may divided the 64×64 macroblock into such subblocks, perform transform and quantization by using sizes corresponding to the respective subblocks, and then determine a transform and quantization block size where the best encoding efficiency is achieved. According to an aspect of the present disclosure, a transform type indicating the determined transform and quantization block size may be reported to a video decoding apparatus by using two flags, transform_size_flag and transform_division_flag.

The transform_size_flag indicates whether or not transform with the original macroblock size is used. For example, when the value of the transform_size_flag is 0, the transform_size_flag indicates that transform and quantization with the original macroblock size of 64×64 is used. Contrarily, when the value of the transform_size_flag is 1, the transform_size_flag indicates that transform and quantization with a subblock size smaller than the original macroblock size of 64×64 is performed. When the value of the transform_size_flag is 1, the transform_division_flag indicating a concrete transform and quantization block size is encoded. For example, the transform_division_flag indicates 32×32 transform and quantization when the value of transform_division_flag is 0, indicates 16×16 transform and quantization when the value of transform_division_flag is 1, and indicates 8×8 transform and quantization when the value of transform_division_flag is 2. An inverse transformer and inverse quantizer 2030 of a video decoding apparatus according to an aspect of the present disclosure may select an inverse transform and inverse quantization block size based on either of both of the two flags, that is, the transform_size_flag and the transform_division_flag.

When the size of a residual block obtained by subtracting a predicted block of a current macroblock or subblock to be encoded from the current macroblock or subblock is larger than a transform and quantization block size determined as described above, the transformer and quantizer 130 divides the residual block into subblocks having the same size as the transform and quantization block size, and then transforms and quantizes each subblock. Contrarily, when the size of the residual block is smaller than the transform and quantization block size, the transformer and quantizer 130 combines a plurality of adjacent residual blocks with each other to generate a combined residual block having the same size as the transform and quantization block size, and then transforms and quantizes the combined residual block.

Figure 9:
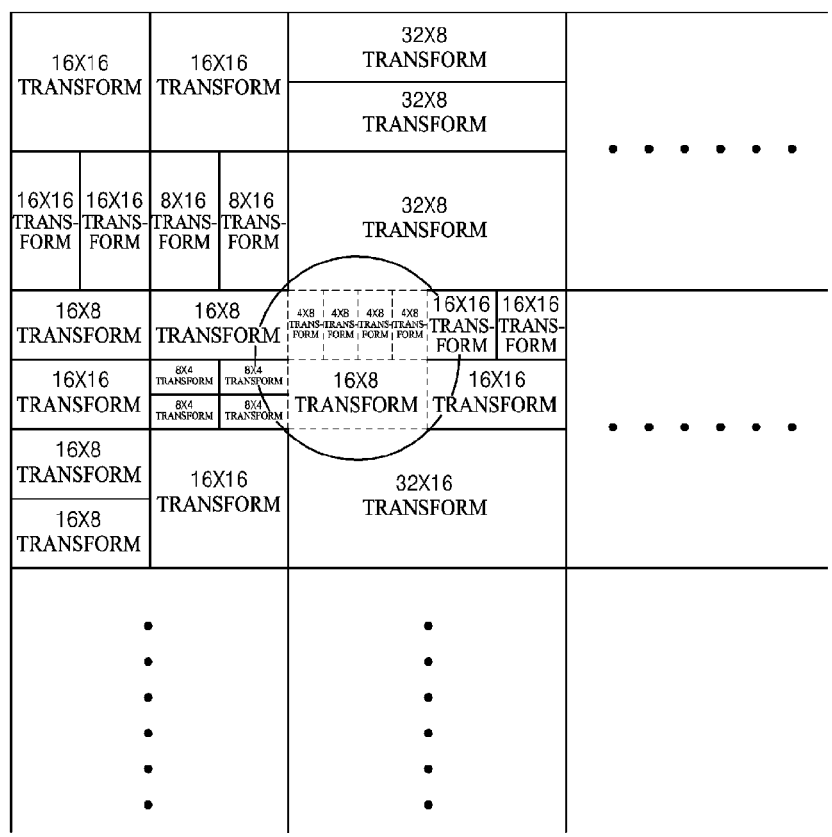
FIG. 9 is a view for explaining filtering in the case of applying various transform and quantization types in accordance with an aspect of the present disclosure.

FIG. 9 is a view for explaining filtering in the case of applying various transform and quantization types in accordance with an aspect of the present disclosure.

FIG. 9 illustrates that when a current block is a macroblock with a size of 32×32, a residual block is transformed and quantized according to various transform and quantization types, the transformed and quantized residual block is inverse-transformed and inverse-quantized again, and then the current block is reconstructed by adding the inverse-transformed and inverse-quantized residual block to a predicted block.

In FIG. 9, the solid lines represent the boundaries of a current macroblock or a sub macroblock of the current macroblock. In the case of performing filtering across the boundaries existing within the area indicated by the solid circle, filtering is performed only across the block boundaries indicated by the dotted lines. With regard to this, filtering may be performed using deblocking filtering for reducing blocking effects, and in this case, a one-dimensional low pass filter is used as a deblocking filter used for deblocking filtering. Filtering is performed across vertical boundaries and then across horizontal boundaries.

In typical video encoding, since transform and quantization is performed using only the 4×4 or 8×8 integer transform, the block boundaries to be subjected to deblocking filtering and/or deringing filtering are increased, which results in an increase in the number of times of performing filtering. However, when transform and quantization with a block size of P×Q is performed according to an aspect of the present invention, the implementation complexity of the video encoding apparatus 100 and a video decoding apparatus can be reduced because the number of times of performing filtering is decreased as compared to that in the typical video encoding, and the encoding efficiency can be improved because less blocking effects are caused.

Further, when transform and quantization with a block size of P×Q is performed according to an aspect of the present invention, the number of pixels to which reference is made for filtering may be increased due to an increase in the transform and quantization block size, which results in a more accurate result of filtering performed, and thus deblocking effects and deringing noise can be further reduced.

Figure 10:
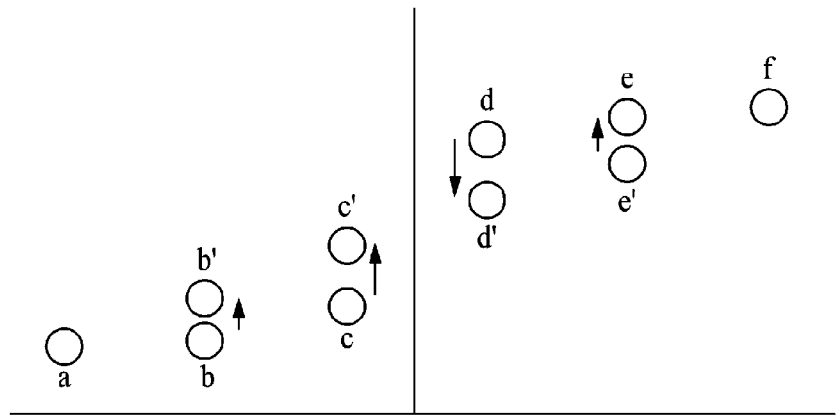
FIG. 10 is a view for explaining a procedure of performing deblocking filtering across a block boundary in accordance with an aspect of the present disclosure.

FIG. 10 is a view for explaining a procedure of performing deblocking filtering across a block boundary in accordance with an aspect of the present disclosure.

In FIG. 10, a, b, c, d, e, and f represent pixels before deblocking filtering is performed across the block boundary, b', c', d', and e' represent pixels after deblocking filtering is performed across the block boundary, and the vertical position of each pixel represents the brightness of the corresponding pixel. The solid line between pixels c and d represents the block boundary. As seen from FIG. 10, before deblocking filtering is performed across the block boundary, a large brightness difference between pixels occurs at the block boundary (the brightness difference between pixels c and d is abruptly increased), and consequently blocking effects are caused.

In order to reduce such blocking effects, deblocking filtering is performed across the block boundary. That is, the brightness of pixels b, c, d, and e prior to filtering is corrected using the brightness of neighboring pixels, and thereby pixels b', c', d', and e' can be generated.

A one-dimensional low pass filter used for deblocking filtering may include a strong filter and a weak filter. The strong filter may be implemented as given in Equation 11, and the weak filter may be implemented as given in Equation 12.

$$d' = \frac{b+c+d+e+f+\alpha}{5} \quad \text{Equation 11}$$

$$d' = \frac{b+3c+8d+3e+\alpha}{16} \quad \text{Equation 12}$$

In Equation 11 and 12, b, c, d, e, f, and d denotes the pixels shown in FIG. 10, and a denotes a round-off constant.

As seen through Equations 11 and 12, a pixel to be filtered is greatly affected by adjacent pixels when filtering is performed using the strong filter, and a weight is placed to a pixel to be filtered and thus the pixel is less affected by adjacent pixels when filtering is performed using the weak filter. Using this concept, filtering may be performed while weights applied to the strong filter and the weak filter are changed, and may also be performed while the number of adjacent pixels and the number of pixels to be filtered are selectively applied. Therefore, according to an aspect of the present disclosure, the result of filtering can be further improved due to an increase in the number of adjacent pixels to which to make reference when transform and quantization with a block size of P×Q is performed and deblocking filtering is performed across a block boundary.

Figure 11:
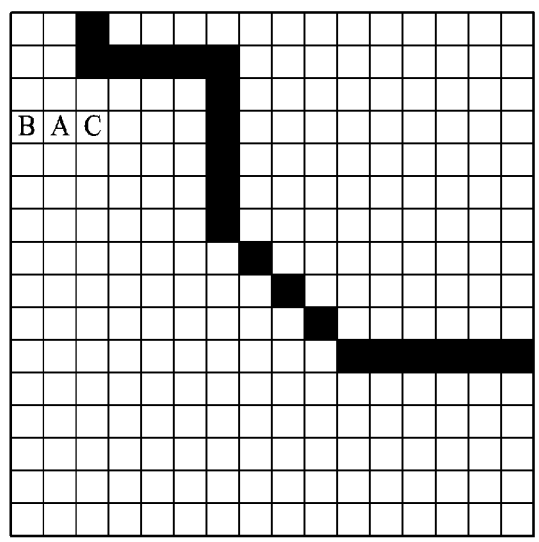
FIG. 11 is a view for explaining a procedure of performing deringing filtering in accordance with an aspect of the present disclosure.

FIG. 11 is a view for explaining a procedure of performing deringing filtering in accordance with an aspect of the present disclosure.

In order to perform deringing filtering, edges must be detected in a video to be reconstructed. To this end, an edge detection process, such as Sobel operation, is performed. A block with edges detected is shown in FIG. 11. In FIG. 11, pixels filled with black color represent edges detected in the corresponding video, A represents a pixel to be filtered, and B and C represent to adjacent pixels when filtering is performed in the horizontal direction. In order to reduce deringing noise, the pixels of the block where edges have been detected are subjected to deringing filtering. A filter used for deringing filtering may be implemented as given in the following equation, and the respective pixels of the block where edges have been detected are filtered in the vertical direction and then in the horizontal direction.

$$A' = \frac{\beta B + \gamma A + \delta C + \alpha}{\lambda} \quad \text{Equation 13}$$

In Equation 13, A denotes a pixel to be filtered, B and C denote adjacent pixels when filtering is performed in the horizontal or vertical direction, and A' denotes a pixel resulting from filtering. Also, $\beta$, $\gamma$, and $\delta$ each denote a weight that is differently applied according to whether pixel B, A, or C is an edge, $\alpha$ denotes a round-off constant, and $\lambda$ denotes the sum of $\beta$, $\gamma$, and $\delta$.

Deringing filtering is performed for a pixel that is not an edge, and the weight given to each pixel when pixel B or C is an edge, the weight given to each pixel when pixels B and C are edges, and the weight given to each pixel when pixels B and C are not an edge may be different. For example, when pixel B or C is an edge, the weight given to pixel C is largest if pixel B is an edge, and the weight given to pixel B is largest if pixel C is an edge. Further, when both pixels B and C are edges, the weights given to pixels B and C are 0. Further, when neither pixels B nor C are edges, the weight given to pixel A is largest.

Using this concept, deringing filtering may be performed while the weight applied to each pixel is changed, and the number of adjacent pixels to which to make reference may also be selectively used. Therefore, according to an aspect of the present disclosure, the result of filtering can be further improved due to an increase in the number of adjacent pixels to which to make reference when transform and quantization with a block size of P×Q is performed and deringing filtering is performed for a block including edges.

Hereinafter, scanning for converting quantized transform coefficients included in a transformed and quantized residual block into a one-dimensional transform coefficient string according to an aspect of the present disclosure will be described.

According to an aspect of the present disclosure, the scanning method may be selected according to whether a current block is an intra block or an inter block.

When quantized transform coefficients of an intra block are scanned according to an aspect of the present disclosure, the scanning pattern may be selected according to the prediction direction of the intra block, that is, the intra prediction mode. More specially, the probability of occurrence of a coefficient in each position of a $2^n \times 2^n$ quantized transform coefficient block is obtained according to modes for which prediction is completed, and the scanning sequence is changed such that frequency domain coefficients having high probability are first scanned. In this way, a method of continuously updating the scanning sequence is applied in a video encoding apparatus and a video decoding apparatus. Through this method, the scanning sequence is set such that scanning is performed in order from the coefficient position having the highest frequency of occurrence or largest coefficient value to the coefficient position having the lowest frequency of occurrence or the highest probability of occurrence of 0, with the result that the efficiency of entropy coding to be used in the encoder 150 after the scanning process is completed is further improved. Here, since each mode for which prediction and transform and quantization are completed is used, a video decoding apparatus can also know each prediction mode, and thus encoding and decoding processes coincide with each other. Through this, encoding and decoding coefficient positions can have the same frequency of occurrence, and the scanning sequence can be the same in encoding and decoding processes.

FIG. 23 illustrates that scanning for an intra 4×4 block may have various scanning sequences according to nine modes based on probability calculation. Each of the nine modes shown in FIG. 23 represents a scanning sequence of 1 to 16. Scanning is performed in order from numeral 1 to numeral 16. The scanning sequence is not a certain pattern, but is a sequence determined based on the sizes of coefficients or probability in the coefficient distribution for each mode for which transform and quantization are completed. The scanning sequence may be updated according to the probability that varies as encoding is performed.

Here, the size of the block may be $2^n \times 2^n$ covering all intra modes, and the scanning sequence is not limited to the nine modes for the intra 4×4 block shown in FIG. 23. If an intra block with a size of $2^n \times 2^n$ has M modes, then the scanning method covers all scanning methods that may have different sequences for all the M modes. Further, the scanning sequence may be updated by continuously obtaining probability for modes for which prediction is completed and changing the scanning sequence according to the obtained probability. Since the modes for which prediction is completed pass through encoding and decoding processes, the decoding process can know the determined modes and probability, from which the scanning sequence is derived, even when additional information on the scanning sequence is encoded, and thus decoding according to the same scanning sequence is possible.

Figure 12:
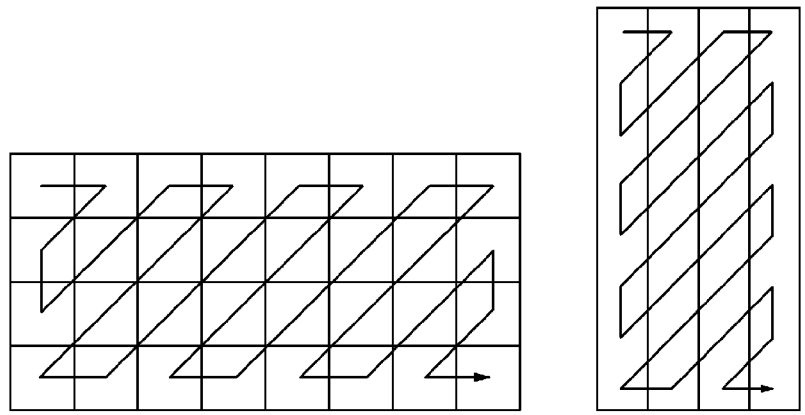
FIG. 12 is a view illustrating a scanning sequence according to transform and quantization types in accordance with an aspect of the present disclosure.

In the case of an inter block, since transform and quantization are performed according to various transform and quantization types, the scanner 140 or the encoder 150 scans quantized transform coefficients of a transformed and quantized residual block according to the transform and quantization type to generate a quantized transform coefficient string. FIG. 12 illustrates a scanning sequence according to the transform and quantization type of an inter block in accordance with an aspect of the present disclosure.

In FIG. 12, the sequence of scanning quantized transform coefficients when a transformed and quantized residual block has a block size of 8×4 and the sequence of scanning quantized transform coefficients when a transformed and quantized residual block has a block size of 4×8 are shown by way of example. The scanning sequences shown in FIG. 12 can be applied adaptively to various transform and quantization types used according to an aspect of the present disclosure, and the encoding efficiency can be further improved by to scanning quantized transform coefficients according to an appropriate scanning sequence. In the case of the DCT, transform coefficients tend to be crowded at the left-top corner (in the direction of the DC coefficient) because transform coefficients after transform are typically gathered together in the frequency part having low energy, and the integer transform also shows the same tendency because it is based on the DCT. Accordingly, it is efficient to set the position of the DC coefficient as the starting point of scanning and scan transform coefficients in decreasing order of their energy, starting from the coefficient positioned nearest to the DC coefficient.

The encoder 150 may encode a quantized transform coefficient string, which is generated by scanning quantized transform coefficients according to the scanning sequence shown in FIG. 12 or a similar scanning sequence, in various manners to generate a bitstream. However, the encoder 150 may scan and encode a transformed and quantized residual block by applying the existing context-based adaptive variable length coding (hereinafter referred to as "CAVLC").

FIGS. 13 to 18 are views for explaining a method of applying the CAVLC according to transform and quantization types in accordance with an aspect of the present disclosure.

In typical vide encoding, the CAVLC is performed only for a 4×4 sized block. However, in an aspect of the present invention, the AVLC may also be performed for blocks having block sizes larger than 4×4.

FIGS. 13 to 18 illustrate that each of transformed and quantized residual blocks having sizes of 8×4, 4×8, 8×8, 16×8, 8×16, and 16×16 respectively is decomposed into 4×4 sized blocks in order to apply the CAVLC. In FIGS. 13 to 18, numerals 1, 2, 3, and 4 entered in respective pixels are given to indicate the position of each pixel, and each 4×4 sized block is formed by gathering up only pixels with the same numeral.

Figure 13:
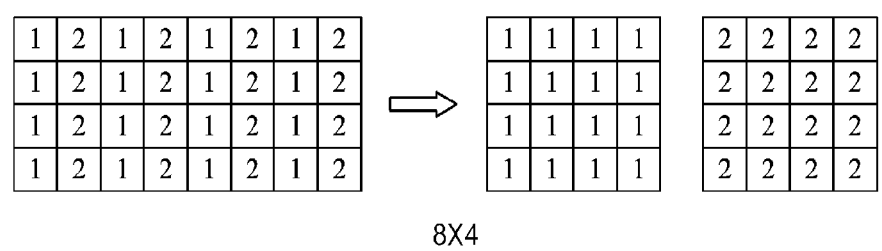
FIGS. 13 to 18 are views for explaining a method of applying CAVLC according to transform and quantization types in accordance with an aspect of the present disclosure.
Figure 14:
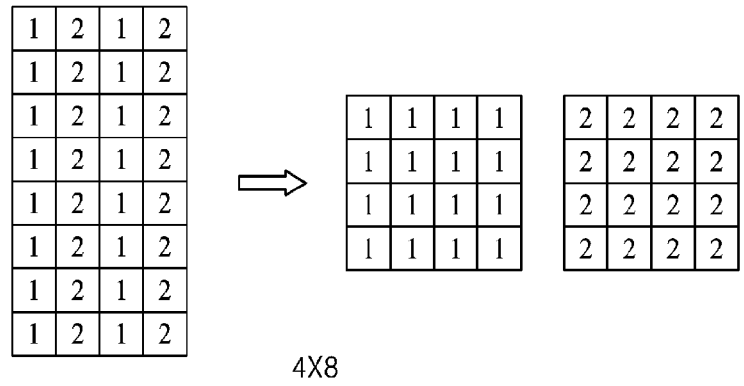

As an example, in the transformed and quantized residual block having a size of 8×4 shown in FIG. 13, numerals 1 and 2 are given every other column, and two transformed and quantized residual blocks each having a size of 4×4 can be obtained by separately gathering up four columns to which numeral 1 is given and four columns to which numeral 2 is given, as shown in the drawing. The encoder 150 encodes the two transformed and quantized residual blocks each having a size of 4×4, obtained as shown in the drawing, by using the CAVLC to generate a bitstream.

Figure 15:
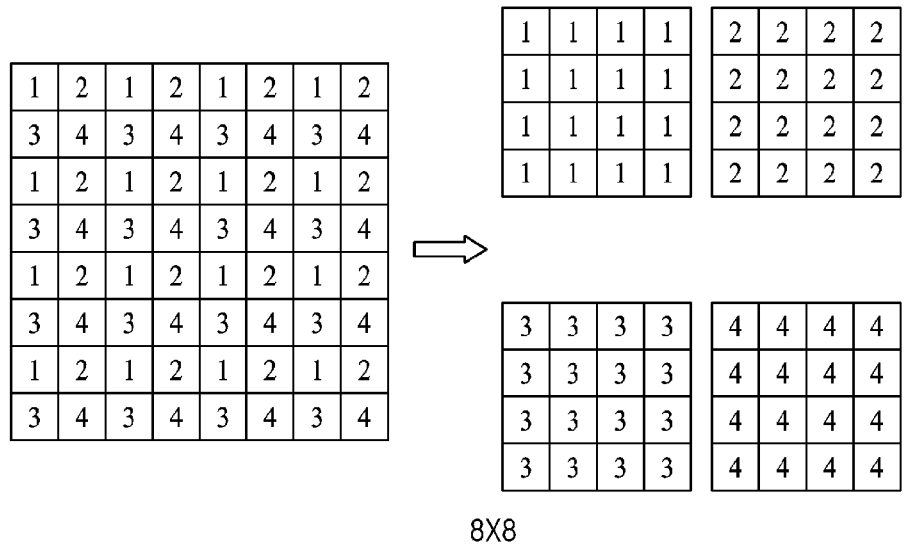
Figure 16:
Figure 17:
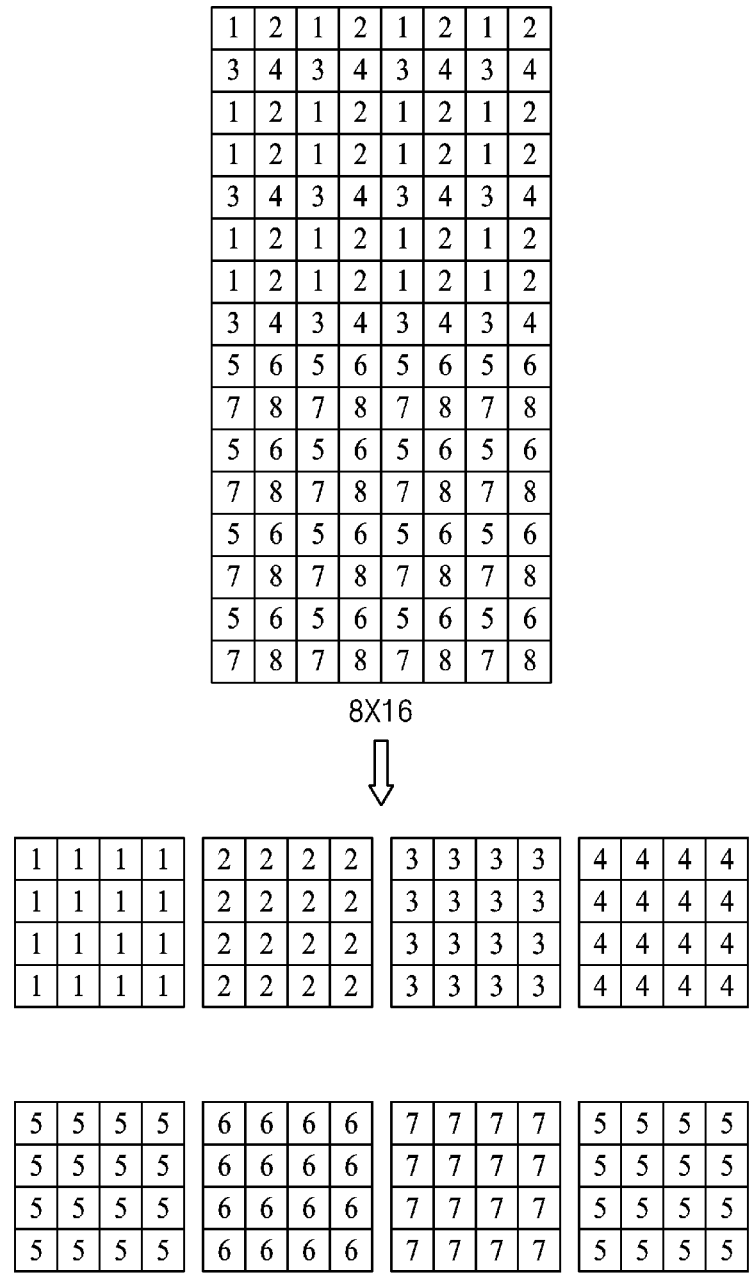
Figure 18:

As another example, in the transformed and quantized residual block having a size of 8×8 shown in FIG. 15, four transformed and quantized residual blocks each having a size of 4×4 can be obtained by separately gathering up pixels to which numeral 1 is given, pixels to which numeral 2 is given, pixels to which numeral 3 is given, and pixels to which numeral 4 is given. The encoder 150 encodes the four transformed and quantized residual blocks each having a size of 4×4, obtained as shown in the drawing, by using the CAVLC to generate a bitstream.

Figure 19:
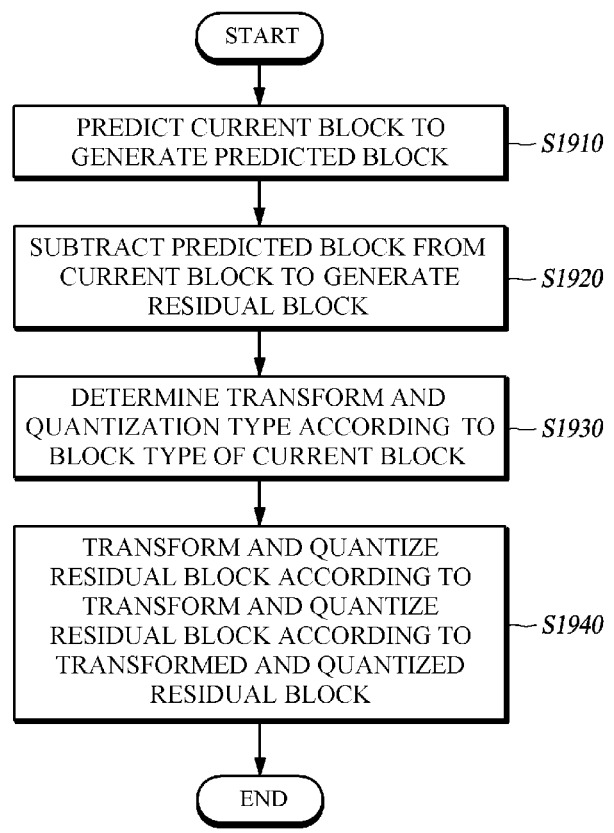
FIG. 19 is a flowchart for explaining a video encoding method in accordance with an aspect of the present disclosure.

FIG. 19 is a flowchart for explaining a video encoding method in accordance with an aspect of the present disclosure.

In the video encoding method according to an aspect of the present disclosure, the video encoding apparatus 100 predicts a current block to generate a predicted block (S1910), generates a residual block by subtracting the predicted block from the current block (S1920), determines a transform and quantization type according to the block type of the current block (S1930), and transforms and quantizes the residual block according to the determined transform and quantization type and encode the transformed and quantized residual block (S1940). Here, the current block is a macroblock having a size of M×M, and M and N may be greater than 16. The block type of the current block, which is used in the step of determining the transform and quantization type (S1930), includes the shape or size of the current block. Further, a prediction mode and the size of a block as the unit of prediction, which are used in the step of generating the predicted block (S1910), may also be used to determine the transform and quantization type.

Further, at step S1910, the video encoding apparatus 100 may generate the predicted block by dividing the current block into a plurality of subblocks, predicting the plurality of subblocks to generate predicted subblocks, and combining the predicted subblocks with each other. To this end, the video encoding apparatus 100 may determine a block type for each frame of the video, and in this case, the current block may be a macroblock according to the determined block type. In determining the block type, the video encoding apparatus 100 may determine the block type by using encoding cost required to encode a frame according to a plurality of block types, but may also determine the block type according to the feature of a frame. This feature of a frame may include one or more of the horizontal correlation and the vertical correlation of the frame. Further, the video encoding apparatus 100 may encode information on the block type and additionally include the information in encoded data.

Further, at step S1930, the video encoding apparatus 100 may determine transform and quantization with a block size equal to the size of the block type as the transform and quantization type when the block type is an intra block type, and may determine one of a plurality of transform and quantization with various block sizes as the transform and quantization type by using encoding cost when the block type is an inter block type. Here, the plurality of transform and quantization with various block sizes may include transform and quantization with the same block size as that of a subblock.

Further, at step S1940, the video encoding apparatus 100 may generate a quantized transform coefficient string by scanning quantized transform coefficients of the transformed and quantized residual block in decreasing order of their energy, starting from the quantized transform coefficient positioned nearest to the DC coefficient, and encode the scanned quantized transform coefficient string.

In addition, the video encoding apparatus 100 may reconstruct the residual block by inverse-transforming and inverse-quantizing the transformed and quantized residual block, reconstruct the current block by adding the reconstructed residual block to the predicted block, and filter the reconstructed current block according to the transform and quantization type. In filtering the reconstructed current block, the video encoding apparatus 100 may perform deblocking filtering across the boundaries of the reconstructed current block according to the transform and quantization type, and perform deringing filtering according to the transform and quantization type. However, both deblocking filtering and deringing filtering must not be performed, but only one or none of deblocking filtering and deringing filtering may be performed.

Further, the video encoding apparatus 100 may encode information on the transform and quantization type determined at step S1930 and include the information in encoded data. Here, in addition to the transform and quantization type, the information included in encoded data may include the information as described above, that is, macroblock information indicating the size or shape of a macroblock as the unit of encoding, information on a prediction mode for the macroblock or a subblock (in the case of dividing the macroblock into a plurality of subblocks for the sake of prediction), macroblock division information indicating the division scheme or the size of subblocks (i.e., blocks as the unit of prediction) in the case where the macroblock is divided into the plurality of subblocks for the sake of prediction, information on a motion vector in the case where the prediction mode is an inter prediction mode, and the like.

As described above, when the video encoding apparatus 100 and the video encoding method according to an aspect of the present invention are used, a high-resolution video can be more efficiently encoded because prediction in units of variable sized macroblocks or subblocks, transform and quantization with various block sizes, scanning and filtering appropriate to the transform and quantization type can be performed. The video encoded into encoded data by the video encoding apparatus 100 may be transmitted in real time or non-real-time to a video decoding apparatus to be described below, where the encoded data is decoded, reconstructed, and reproduced into the video, via a wired/wireless communication network including the Internet, a short range wireless communication network, a wireless LAN network, a WiBro (Wireless Broadband) also known as WiMax network, and a mobile communication network or a communication interface such as cable or USB (universal serial bus).

Figure 20:
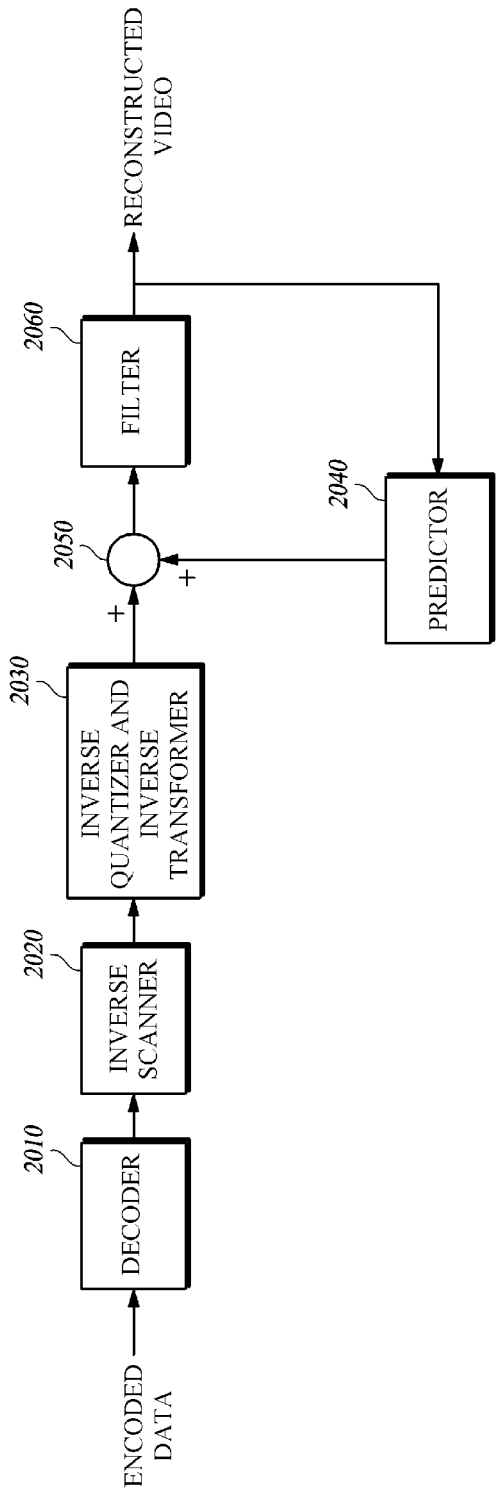
FIG. 20 is a schematic block diagram of a video decoding apparatus in accordance with an aspect of the present disclosure.

FIG. 20 schematically illustrates a video decoding apparatus in accordance with an aspect of the present disclosure.

The video decoding apparatus 2000 according to an aspect of the present disclosure may include a decoder 2010, an inverse scanner 2020, an inverse quantizer and inverse transformer 2030, a predictor 2040, an adder 2050, and a filter 2060. Here, the inverse scanner 2020 and the filter 2060 must not be necessarily included in the video decoding apparatus 2000 and may be omitted according to the implementation design of the video decoding apparatus 2000. When the inverse scanner 2020 is omitted, its function may be incorporated in the decoder 2010.

The decoder 2010 receives video data obtained by dividing an input video into a plurality of macroblocks having different shapes or sizes and encoding each macroblock, and decodes macroblock information indicating the shape or size of each macroblock.

The decoder 2010 decodes encoded data (i.e., video data obtained by encoding macroblocks in a video encoding apparatus and transmitted from the video encoding apparatus) to reconstruct a transformed and quantized residual block. That is, the decoder 2010 decodes encoded data to reconstruct a quantized transform coefficient string. When the function of the scanner 140 is incorporated in the encoder 150 of the video encoding apparatus 100, the inverse scanner 2020 is also omitted from the video decoding apparatus 2000 and its function is incorporated in the decoder 2010. Therefore, the decoder 2010 may reconstruct the transformed and quantized residual block by inverse-scanning the reconstructed quantized transform coefficient string.

Further, the decoder 2010 may decode or extract information necessary for decoding, as well as the transformed and quantized residual block, by decoding the encoded data. The information necessary for decoding means information required to decode a bitstream encoded in the encoded data, which may be, for examples, macroblock information indicating the size or shape of a macroblock as the unit of encoding, information on a prediction mode for the macroblock or a subblock (in the case of dividing the macroblock into a plurality of subblocks for the sake of prediction), macroblock division information indicating the division scheme or the size of subblocks (i.e., blocks as the unit of prediction) in the case where the macroblock is divided into the plurality of subblocks for the sake of prediction, information on a motion vector in the case where the prediction mode is an inter prediction mode, information on the transform and quantization type, and the like, but may also be various other information.

The decoder 2010 parses the input bitstream to recognize the hierarchical structure of the encoded video and a concrete algorithm to be used for decoding. More specially, the decoder 2010 recognizes the shape or size of each macroblock as the unit of encoding through the macroblock information. What type and/or size of transform and quantization is to be performed is determined through the information on the transform and quantization type. The size or shape of a prediction unit block as the unit of prediction is determined through the macroblock division information. What prediction mode is used to generate a predicted block of the current macroblock or subblock (in the case where the macroblock is divided into a plurality of subblocks for the sake of prediction) is determined through the prediction mode information.

The macroblock information parsed by the decoder 2010 may be transferred to the inverse quantizer and inverse transformer 2030 and the predictor 2040. The information on the transform and quantization type may be transferred to the inverse quantizer and inverse transformer 2030, and information necessary for prediction, such as the prediction mode information, the macroblock division information, and the motion vector information, may be transferred to the predictor 2040.

The inverse scanner 2020 inverse-scans the quantized transform coefficient string reconstructed by and transferred from the decoder 2010 to reconstruct the transformed and quantized residual block. As mentioned above, when the function of the scanner 140 is incorporated in the encoder 150 of the video encoding apparatus 100, the inverse scanner 2020 may also be omitted from the video decoding apparatus 2000 and its function may be incorporated in the decoder 2010. Further, the decoder 2010 or the inverse scanner 2020 inverse-scans the transformed and quantized residual block according to the transform and quantization type identified by the information on the transform and quantization type, which is reconstructed by decoding the encoded data in the decoder 2010. Here, in the case of an inter block, the method of inverse-scanning the transformed and quantized residual block according to the transform and quantization type by the inverse scanner 2020 is the same as or similar to the method of inversely performing the process of scanning quantized transform coefficients of the transformed and quantized residual block by the scanner 140, as described with reference to FIGS. 1 and 12. In the case of an intra block, coefficients are scanned according to the scanning pattern for each intra prediction mode in the same manner as described above. The inverse-scanning method is performed in the same sequence as the scanning sequence in the scanner 140, so a detailed description thereof will be omitted.

The inverse quantizer and inverse transformer 2030 inverse-quantizes and inverse-transforms the reconstructed transformed and quantized residual block to reconstruct the residual block. With regard to this, the inverse quantizer and inverse transformer 2030 inverse-quantizes and inverse-transforms the transformed and quantized residual block according to the transform and quantization type identified by the information on the transform and quantization type transferred from decoder 2010. Here, the method of inverse-quantizing and inverse-transforming the transformed and quantized residual block according to the transform and quantization type by the inverse quantizer and inverse transformer 2030 is the same as or similar to the method of inversely performing the process of performing transform and quantization according to the transform and quantization type by the transformer and quantizer 130 of the video encoding apparatus 100, so a detailed description thereof will be omitted.

When the size of the residual block generated by the inverse transform and inverse quantization process is larger than that of the predicted block, the inverse quantizer and inverse transformer 2030 divides the residual block into subblocks each having the same size as the predicted block, and then outputs the divided subblocks to the adder 2050. Contrarily, when the size of the residual block generated by the inverse transform and inverse quantization process is smaller than that of the predicted block, the inverse quantizer and inverse transformer 2030 combines a plurality of adjacent residual blocks to generate a combined residual block having the same size as the predicted block, and then outputs the generated combined residual block to the adder 2050. The predictor 2040 predicts the current block to generate the predicted block. Here, the predictor 2040 predicts the current blocks by using the macroblock information and the information necessary for prediction transferred from the decoder 2010. That is, the predictor 2040 determines the size and shape of the current macroblock according to the macroblock information, and predicts the current macroblock by using the intra prediction mode or the motion vector identified by the information necessary for prediction to generate the predicted block. When the macroblock information indicates that the current macroblock has been divided into a plurality of subblocks, the predictor 2040 may divide the current macroblock into the subblocks and predict each divided subblock to generate the predicted subblock in the same manner as or in a similar manner to the predictor 110 of the video encoding apparatus 100.

The adder 2050 adds the residual block reconstructed by the inverse quantizer and inverse transformer 2030 and the predicted block generated by the predictor 2040 to reconstruct the current block.

The filter 2060 filters the current block reconstructed by the adder 2050. The reconstructed and filtered current block is accumulated by pictures and is stored as a reference picture in a memory (not shown) for use when the predictor 2040 predicts the next block or the next picture. Here, when the filter 2060 filters the reconstructed current block, it performs filtering according to the transform and quantization type identified by the information on the transform and quantization type transferred from the decoder 2010. With regard to this, the filter 2060 may perform deblocking filtering across the boundaries of the current block in a different manner according to the transform and quantization type or perform deringing filtering of the current block in a different manner according to the transform and quantization type when edges are detected in the current block, thereby reducing blocking effects occurring at the block boundaries of the reconstructed video or reducing ringing noise occurring around the edges in the block. The method of performing deblocking filtering and deringing filtering by the filter 2060 is the same as or similar to the method of performing deblocking filtering and deringing filtering by the filter 180 of the video encoding apparatus 100, so a detailed description thereof will be omitted.

Figure 21:
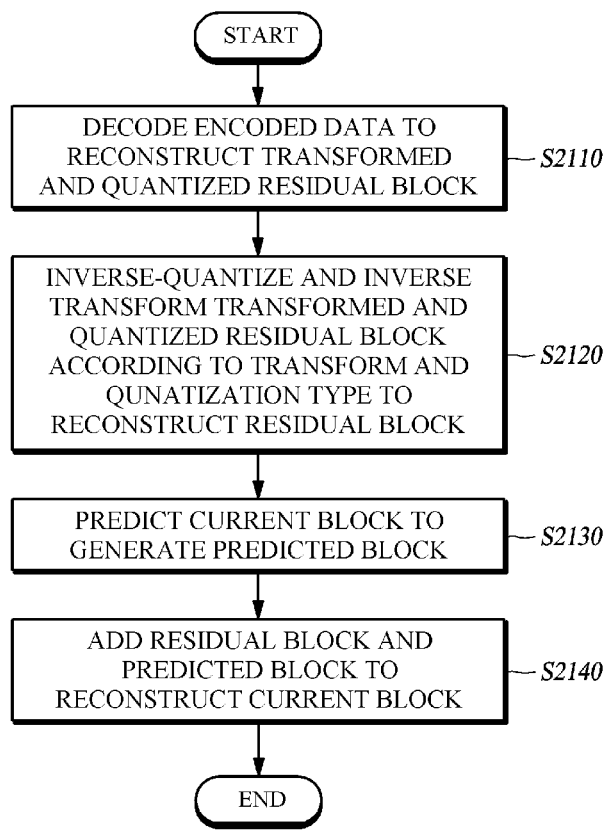
FIG. 21 is a flowchart for explaining a video decoding method in accordance with an aspect of the present disclosure.

FIG. 21 is a flowchart for explaining a video decoding method in accordance with an aspect of the present disclosure.

In the video decoding method according to an aspect of the present disclosure, the video decoding apparatus 2000 decodes encoded data to reconstruct a transformed and quantized residual block (S2110), inverse-transforms and inverse-quantizes the transformed and quantized residual block to reconstruct the residual block (S2120), predicts the current block to generate the predicted block (S2130), and adds the reconstructed residual block and the predicted block to reconstruct the current block (S2140).

The video decoding apparatus 2000 may additionally reconstruct information on the transform and quantization type by decoding the encoded data. Thus, at step S2120, the video decoding apparatus 2000 inverse-transforms and inverse-quantizes the transformed and quantized residual block according to the transform and quantization type identified by the information on the transform and quantization type.

Further, at step S2140, the video decoding apparatus 2000 may filter the reconstructed current block according to the transform and quantization type. That is, the video decoding apparatus 2000 performs deblocking filtering across the boundaries of the reconstructed current block according to the transform and quantization type, and performs deringing filtering of the reconstructed current block according to the transform and quantization type. Here, both deblocking filtering and deringing filtering may be performed, but only one of them may also be selectively performed or none of them may also be performed. The video decoding apparatus 2000 may perform deblocking filtering in a different manner according to the transform and quantization type, and may perform deringing filtering in a different manner according to the transform and quantization type. Meanwhile, the current block is an M×N sized macroblock, and M and N may be greater than 16.

Further, in generating the predicted block at step S2130, the video decoding apparatus 2000 may divide the current block into a plurality of subblocks, predict the plurality of subblocks to obtain predicted subblocks, and combine the predicted subblocks to generate the predicted block.

Further, the video decoding apparatus 2000 may additionally reconstruct macroblock information for each frame of the video, and in this case, the current block may be a macroblock having the size or shape identified by the reconstructed macroblock information.

As described above, according to an aspect of the present disclosure, the encoding efficiency can be improved because it enables an encoding of a high-resolution video by properly using a high correlation between temporally/spatially adjacent pixels appearing in the high-resolution video through a variable sized macroblock and corresponding transform and quantization with a block size of P×Q, scanning with a block size of P×Q, and filtering. Further, since block distortion is reduced due to the use of a macroblock and transform and quantization with an extended block size, not only the encoding efficiency can be improved, but the number of times of performing transform and deblocking filtering across block boundaries, which may be performed in encoding and decoding, can also be decreased, which makes it possible to decrease the implementation complexity of video encoding and decoding apparatuses 100, 2000.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of video compression processing where a high-resolution video is encoded and decoded. In particular, not only the encoding efficiency can be improved because it enables an encoding using a high correlation between temporally/spatially adjacent pixels appearing in a video, but the compression efficiency can also be improved by reducing block distortion. Further, the number of times of performing filtering can be decreased, which makes it possible to decrease the implementation complexity of video encoding and decoding apparatuses.

The invention claimed is:

1. A video decoding method for decoding video data obtained by dividing an input video into a plurality of macroblocks having various sizes and encoding each of the macroblocks, the method comprising:
    decoding macroblock information indicating the size of each of the macroblocks; and
    decoding a macroblock based on the macroblock information,
        wherein, when the macroblock is intra-predicted, the decoding of the macroblock comprises:
        decoding macroblock division information indicating whether the macroblock is divided into subblocks;
        predicting a subblock divided from the macroblock based on the macroblock division information to thereby obtain a predicted subblock;
        reconstructing transform coefficients of the subblock based on a scanning pattern to thereby obtain a transformed and quantized residual subblock;
        inverse-quantizing and inverse-transforming the transformed and quantized residual subblock to thereby generate a residual subblock; and
        reconstructing the subblock by adding the residual subblock to the predicted subblock,
        wherein the scanning pattern of the subblock is selected among a plurality of scanning patterns, based on an intra prediction mode used for prediction of the subblock.

2. The video decoding method as claimed in claim 1, wherein the scanning pattern of the subblock is determined based on the intra prediction mode used for prediction of the subblock, when the subblock has a size of 4×4.

3. The video decoding method as claimed in claim 1, wherein the inverse quantizing and inverse transforming comprises:
   inverse-quantizing the transformed and quantized residual subblock to generate a transformed residual block;
   determining an inverse transform type based on at least one of the size of the macroblock, a prediction mode of the subblock, and the size of the subblock;
   inverse-transforming the transformed residual subblock according to the determined inverse transform type to obtain the residual subblock.

4. The video decoding method as claimed in claim 3, wherein determining of the inverse transform type comprises:
   determining the inverse transform type based on information indicating the inverse transform type.

5. The video decoding method as claimed in claim 4, wherein the information indicating the inverse transform type includes the size or kind of inverse transform.

6. The video decoding method as claimed in claim 1, wherein each of the macroblocks has a rectangular shape in which lengths of horizontal and vertical sides are different.

7. The video decoding method as claimed in claim 1, wherein a size of the inverse-transforming is identical to a size of the subblock.

8. A video decoding apparatus for decoding video data obtained by dividing an input video into a plurality of macroblocks having various sizes and encoding each of the macroblocks, the apparatus comprising:
   a decoder configured to
      decode macroblock information indicating the size of each of the macroblocks,
      decode macroblock division information indicating whether a macroblock identified by the macroblock information is into subblocks, and
      reconstruct transform coefficients of a subblock identified by the macroblock division information, based on a scanning pattern corresponding to the subblock, and thereby generate transformed and quantized residual subblock;
   an inverse quantizer and inverse transformer configured to inverse-quantize and inverse-transform the transformed and quantized residual subblock to thereby generate residual subblock;
   a predictor configured to generate a predicted subblock by intra-predicting the subblock; and
   an adder configured to reconstruct the subblock by adding the predicted subblock to the residual subblock,
   wherein the decoder is configured to select the scanning pattern corresponding to the subblock among a plurality of scanning patterns, based on an intra prediction mode of the subblock.

9. The video decoding apparatus of claim 8, wherein the decoder is configured to select the scanning pattern of the subblock based on the intra prediction mode of the subblock, when the subblock has a size of 4*4.

\* \* \* \* \*